United States Patent
Hyodo et al.

(10) Patent No.: US 9,511,759 B2
(45) Date of Patent: Dec. 6, 2016

(54) CLUTCH CONTROL DEVICE FOR WORK VEHICLE

(71) Applicant: KCM Corporation, Hyogo (JP)

(72) Inventors: Koji Hyodo, Kasumigaura (JP); Tetsuji Tanaka, Abiko (JP); Isamu Aoki, Tsukuba (JP); Keigo Kikuchi, Ryugasaki (JP)

(73) Assignee: KCM Corporation, Hyogo (JP)

( * ) Notice: Subject to any disclaimer, the term of this patent is extended or adjusted under 35 U.S.C. 154(b) by 0 days.

(21) Appl. No.: 14/358,582

(22) PCT Filed: Nov. 15, 2012

(86) PCT No.: PCT/JP2012/079687
§ 371 (c)(1),
(2) Date: May 15, 2014

(87) PCT Pub. No.: WO2013/073630
PCT Pub. Date: May 23, 2013

(65) Prior Publication Data
US 2014/0288787 A1  Sep. 25, 2014

(30) Foreign Application Priority Data

Nov. 15, 2011  (JP) ................. 2011-250022

(51) Int. Cl.
*B60W 10/02* (2006.01)
*B60W 10/184* (2012.01)
*B60W 30/18* (2012.01)

(52) U.S. Cl.
CPC ............ *B60W 10/02* (2013.01); *B60W 10/184* (2013.01); *B60W 30/18109* (2013.01); *B60W 2510/182* (2013.01); *B60W 2540/10* (2013.01)

(58) Field of Classification Search
CPC  B60Y 2200/415; E02F 9/202; E02F 9/2253; F16D 2500/1112; B60W 10/02; B60W 10/184

See application file for complete search history.

(56) References Cited

U.S. PATENT DOCUMENTS 4,091,902 A * 5/1978 Hamada ............... B60K 41/025
                                                       192/44
5,957,805 A   9/1999 Salecker et al.
(Continued)

FOREIGN PATENT DOCUMENTS

CN   1550697 A    12/2004
DE   31 51 087 A1  7/1983
(Continued)

OTHER PUBLICATIONS

International Search Report dated Feb. 5, 2013 (Two (2) pages).
(Continued)

*Primary Examiner* — Adam Tissot
*Assistant Examiner* — Aaron Smith
(74) *Attorney, Agent, or Firm* — Crowell & Moring LLP

(57) ABSTRACT

A clutch control device for a work vehicle includes a determination unit that determines as to whether or not a clutch cutoff condition has been established based upon whether or not the accelerator pedal is being operated, as determined by the accelerator pedal operation determination unit, the vehicle speed of the work vehicle detected by the vehicle speed detection unit and the braking force of the work vehicle detected by the braking force detection unit; and a clutch control unit that controls engagement/release of a clutch so as to release the clutch when the determination unit determines that the clutch cutoff condition has been established.

7 Claims, 16 Drawing Sheets

(56) References Cited

U.S. PATENT DOCUMENTS

Figure 1:
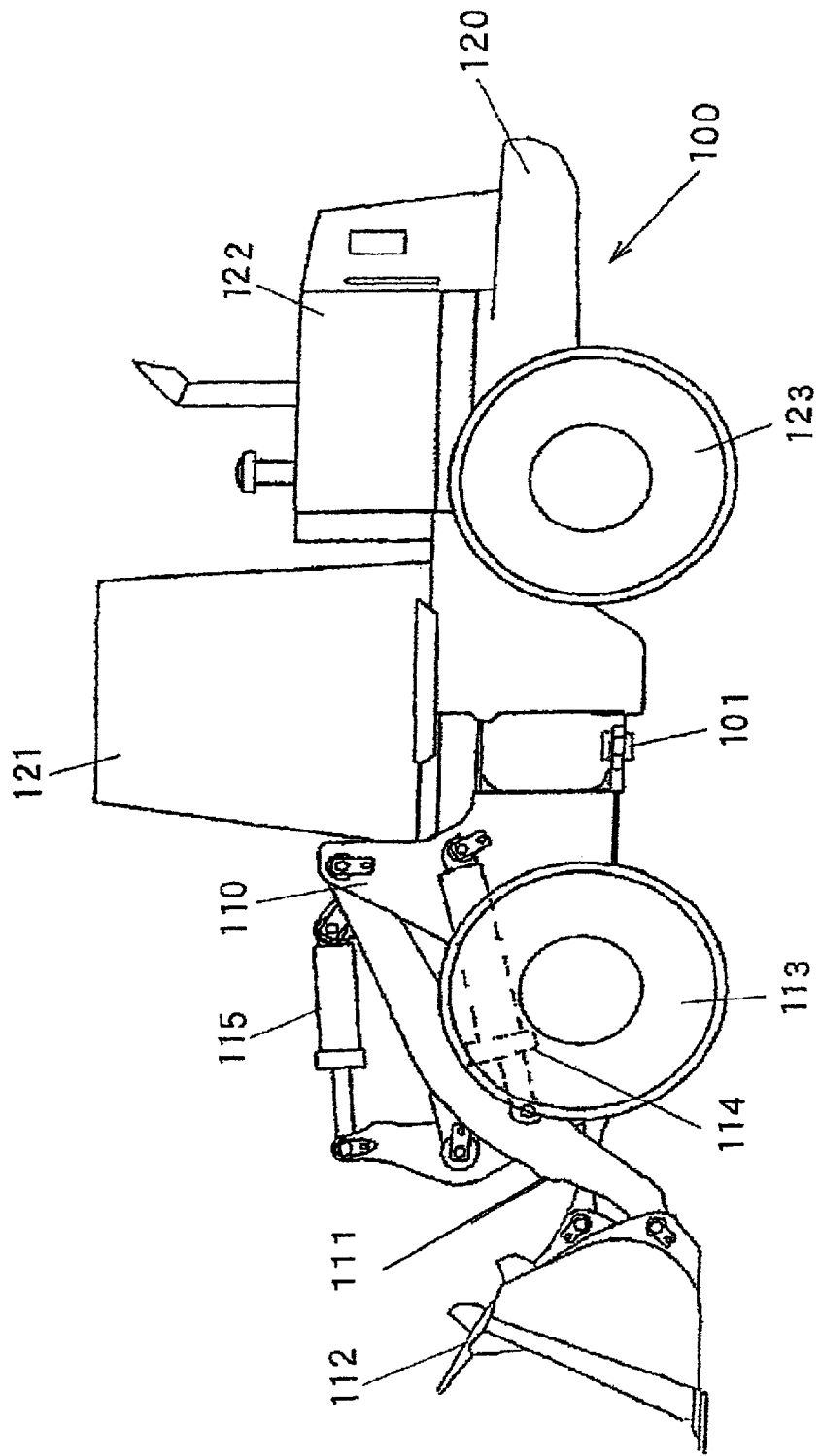

| | | | |
|---|---|---|---|
| 6,502,908 B1 | 1/2003 | Mueller et al. | |
| 2004/0229728 A1* | 11/2004 | Oshima | F16H 61/143 477/176 |

FOREIGN PATENT DOCUMENTS

| | | | |
|---|---|---|---|
| DE | 197 19 614 A1 | 11/1997 | |
| DE | 101 53 328 A1 | 11/2002 | |
| DE | 102 09 100 A1 | 3/2003 | |
| EP | 1 048 538 A2 | 11/2000 | |
| EP | 1 602 850 A1 | 12/2005 | |
| EP | 2 514 987 A1 | 10/2012 | |
| JP | S52-1826 A | 1/1977 | |
| JP | 2001-263384 A | 9/2001 | |
| JP | 2005-299732 A | 10/2005 | |
| JP | 2011-122707 A | 6/2011 | |
| JP | WO2011074582 | * | 6/2011 |
| KR | 20090117262 A | * | 11/2009 |

OTHER PUBLICATIONS

Chinese Office Action issued in counterpart Chinese Application No. 201280055815.9 dated Dec. 21, 2015 (nine pages).

European Search Report issued in counterpart European Application No. 12849782.3 dated Aug. 5. 2016 (seven pages).

* cited by examiner

CLUTCH CONTROL DEVICE FOR WORK VEHICLE

TECHNICAL FIELD

The present invention relates to a clutch control device for a work vehicle.

BACKGROUND ART

A clutch control device known in the related art cuts off transmission of a traveling drive force to the wheels by releasing clutches in correspondence to the vehicle speed and the level of braking force imparted in response to a brake pedal operation (see patent literature 1).

The clutch control device disclosed in patent literature 1 releases the clutches at a higher level of braking force when the vehicle is traveling at high speed compared to the level of braking force at which the clutches are released when the vehicle is traveling at low speed. This means that since the clutches are not released while the vehicle is traveling at high speed, even if the brake pedal is operated to the extent to which the clutches would be released during low-speed traveling operation, the vehicle can be decelerated by engaging the engine brake in an effective manner without placing a great load on the service brakes.

CITATION LIST

Patent Literature

Patent literature 1: Japanese Laid Open Patent Publication No. 2005-299732

SUMMARY OF THE INVENTION

Technical Problem

In the clutch control device disclosed in patent literature 1, which judges the traveling condition of the work vehicle by simply determining whether it is traveling at high speed or low speed, individual braking pressure cutoff threshold values at which the clutches are released are set for a low-speed traveling state and for a high-speed traveling state. Since the clutch control device disclosed in patent literature 1 does not fully factor in the state of the work vehicle, optimal clutch release timing cannot be assured.

Solution to Problem

A clutch control device for a work vehicle according to a first aspect of the present invention comprises: an accelerator pedal operation determination unit that determines as to whether or not an accelerator pedal is being operated; a vehicle speed detection unit that detects a vehicle speed of the work vehicle; a braking force detection unit that detects a braking force of the work vehicle; a determination unit that determines as to whether or not a clutch cutoff condition has been established based upon whether or not the accelerator pedal is being operated, as determined by the accelerator pedal operation determination unit, the vehicle speed of the work vehicle detected by the vehicle speed detection unit and the braking force of the work vehicle detected by the braking force detection unit; and a clutch control unit that controls engagement/release of a clutch so as to release the clutch when the determination unit determines that the clutch cutoff condition has been established.

According to a second aspect of the present invention, in the clutch control device for a work vehicle according to the first aspect, it is preferable that the clutch cutoff condition is set so that when the vehicle speed is on a low-speed side, the clutch is released at a lower braking force if the accelerator pedal is not being operated than if the accelerator pedal is being operated.

According to a third aspect of the present invention, in the clutch control device for a work vehicle according to the first or second aspect, it is preferable that the clutch cutoff condition is set so that when the accelerator pedal is being operated, the clutch is released at a lower braking force if the vehicle speed is higher and that when the accelerator pedal is not being operated, the clutches are released at a predetermined braking force regardless of the vehicle speed.

According to a fourth aspect of the present invention, in the clutch control device for a work vehicle according to any one of the first to third aspects, it is preferable to further comprise: a speed stage detection unit that detects a speed stage set at a transmission, wherein: the determination unit determines as to whether or not the clutch cutoff condition has been established by further factoring in the speed stage at the transmission detected by the speed stage detection unit; and the clutch cutoff condition is set so that the clutch is released at a lower braking force at least when second speed is set than when first speed is set.

A clutch control device for a work vehicle according to a fifth aspect comprises: an accelerator pedal operation determination unit that determines as to whether or not an accelerator pedal is being operated; a braking force detection unit that detects a braking force of the work vehicle; a determination unit that determines as to whether or not a clutch cutoff condition has been established based upon whether or not the accelerator pedal is being operated, as determined by the accelerator pedal operation determined unit, and the braking force of the work vehicle detected by the braking force detection unit; and a clutch control unit that controls engagement/release of a clutch so as to release the clutch when the determination unit determines that the clutch cutoff condition has been established.

According to a sixth aspect of the present invention, in the clutch control device for a work vehicle according to the fifth aspect, it is preferable that the clutch cutoff condition is set so that the clutch is released at a lower braking force if the accelerator pedal is not being operated than if the accelerator pedal is being operated.

According to a seventh aspect of the present invention, in the clutch control device for a work vehicle according to the fifth or sixth aspect, it is preferable to further comprise: a speed stage detection unit that detects a speed stage set at a transmission, wherein: the determination unit determines as to whether or not the clutch cutoff condition has been established by further factoring in the speed stage at the transmission detected by the speed stage detection unit; and the clutch cutoff condition is set so that the clutch is released at a lower braking force at least when second speed is set than when first speed is set.

A clutch control device for a work vehicle according to an eighth aspect of the present invention comprises: a vehicle speed detection unit that detects a vehicle speed of the work vehicle; a braking force detection unit that detects a braking force of the work vehicle; a determination unit that determines as to whether or not a clutch cutoff condition has been established based upon the vehicle speed of the work vehicle detected by the vehicle speed detection unit and the braking force of the work vehicle detected by the braking force detection unit; and a clutch control unit that controls engagement/release of a clutch so as to release the clutch when the determination unit determines that the clutch cutoff condition has been established, wherein: the clutch cutoff condition is set so that the clutch is released at a lower braking force if the vehicle speed is higher.

According to a ninth aspect of the present invention, in the clutch control device for a work vehicle according to the eighth aspect, it is preferable to further comprise: a speed stage detection unit that detects a speed stage set at a transmission, wherein: the determination unit determines as to whether or not the clutch cutoff condition has been established by further factoring in the speed stage at the transmission detected by the speed state detection unit; and the clutch cutoff condition is set so that the clutch is released at a lower braking force at least when second speed is set than when first speed is set.

According to a tenth aspect of the present invention, in the clutch control device for a work vehicle according to any one of the first to ninth aspects, it is preferable to further comprise: an error determination unit that determines as to whether or not an error has occurred at the vehicle speed detection unit, wherein: when the error determination unit determines that an error has occurred at the vehicle speed detection unit, the clutch is released at a predetermined braking force regardless of whether or not the accelerator pedal is being operated, as determined by the accelerator pedal operation determination unit, and the vehicle speed of the work vehicle detected by the vehicle speed detection unit.

According to an eleventh aspect of the present invention, in the clutch control device for a work vehicle according to any one of the first to tenth aspects, it is preferable to further comprise: a mode switching unit that enables selection of the clutch cutoff condition between a first mode, in which the clutch is released at a low braking force, and a second mode, in which the clutch is released at a high braking force.

According to a twelfth aspect of the present invention, in the clutch control device for a work vehicle according to any one of the first to eleventh aspects, it is preferable to further comprise: a transmission that includes a plurality of speed stages, wherein: the determination unit determines as to whether or not the clutch cutoff condition has been established only if a low speed stage is currently selected at the transmission.

Advantageous Effect of the Invention

According to the present invention, the work vehicle can be smoothly brought to a stop by releasing the clutch with a timing that corresponds to the current work vehicle state.

BRIEF DESCRIPTION OF THE DRAWINGS (FIG. 1) A side elevation of a wheel loader representing an example of a work vehicle
(FIG. 2) A diagram schematically illustrating the structure of a control system in the wheel loader
(FIG. 3) A relationship between the vehicle speed and the traveling drive force manifesting at each speed stage
(FIG. 4) A diagram schematically illustrating the structure of a transmission
(FIG. 5) A relationship between the torque converter speed ratio and the speed stage
(FIG. 6) A relationship between the operation quantity of a brake pedal and the braking pressure
(FIG. 7) A relationship between the operation quantity of an accelerator pedal and the target engine rotation speed
(FIG. 8) An illustration of V-shaped loading
(FIG. 9) An illustration of the wheel loader engaged in loading operation to load dirt or the like onto a dump truck
(FIG. 10) An illustration of the wheel loader engaged in operation on a sloping road
(FIG. 11) Diagrams indicating the clutch cutoff condition
(FIG. 12) A flowchart of the clutch control processing operation executed in the wheel loader in an embodiment of the present invention
(FIG. 13) A flowchart of the clutch control processing operation executed in the wheel loader in the embodiment of the present invention
(FIG. 14) A flowchart of the clutch control processing operation executed in the wheel loader in the embodiment of the present invention
(FIG. 15) A flowchart of the clutch control processing operation executed in the wheel loader in the embodiment of the present invention

DESCRIPTION OF EMBODIMENT

In reference to the drawings, an embodiment of a clutch control device for a work vehicle according to the present invention is described. FIG. 1 is a side elevation of a wheel loader representing an example of a work vehicle equipped with the clutch control device achieved in the embodiment. A wheel loader 100 comprises a front body 110 that includes an arm 111, a bucket 112 constituting a work device, tires 113 and the like and a rear body 120 that includes an operator's cab 121, an engine compartment 122, tires 123 and the like. As the arm 111 is driven via an arm cylinder 114, it rotates up/down (moves upward or downward), whereas as the bucket 112 is driven via a bucket cylinder 115, it rotates up/down (the bucket 112 is engaged in a digging operation or a dumping operation). The front body 110 and the rear body 120 are connected with each other via a center pin 101 so as to articulate freely relative to each other. As a steering cylinder (not shown) extends/contracts, the front body 110 pivots to the left or to the right relative to the rear body 120.

Figure 2:
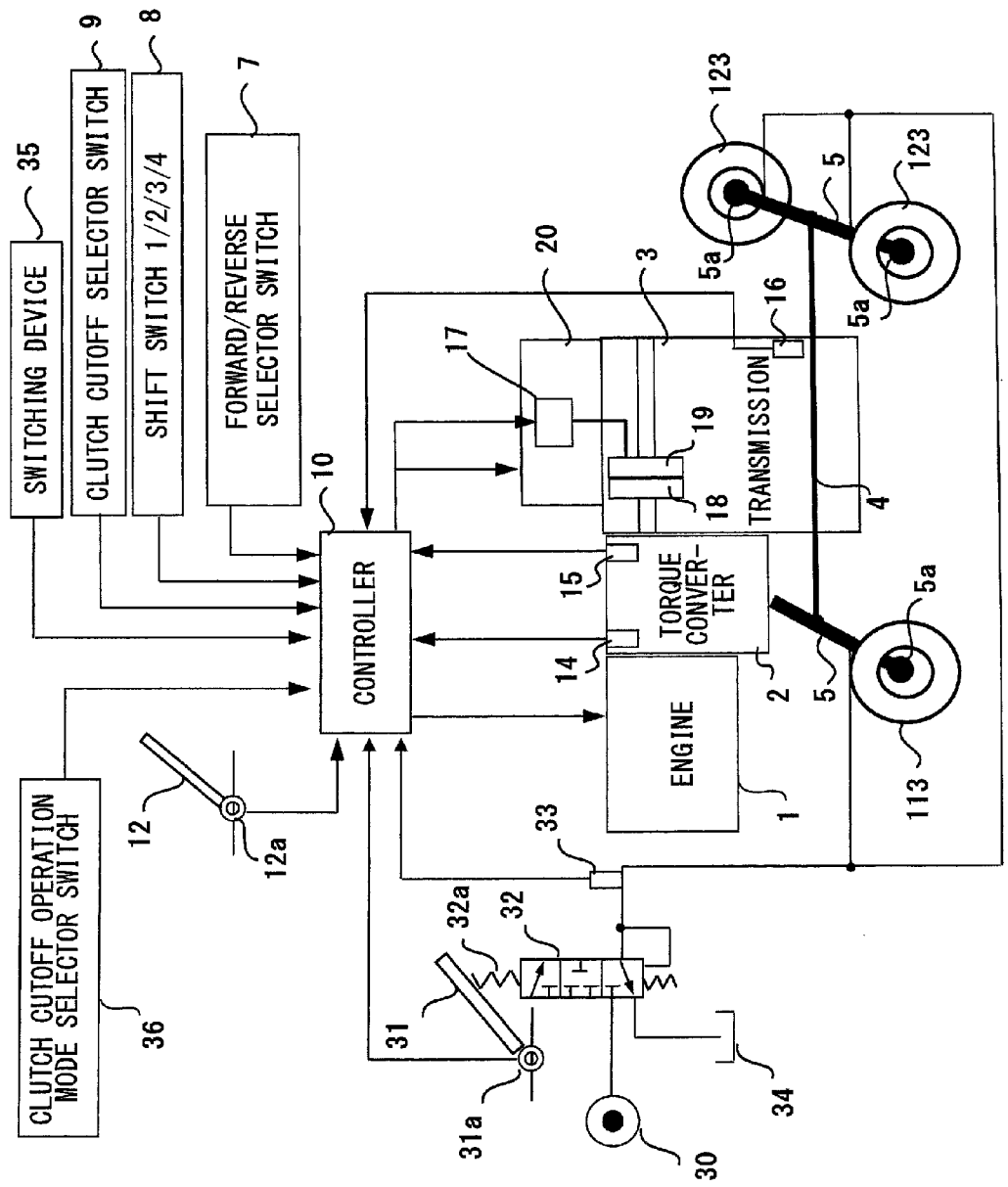

FIG. 2 presents a diagram schematically illustrating the structure of the control system in the wheel loader 100. An input shaft 21 (see FIG. 4) of a torque converter 2 is linked to an output shaft of an engine 1, whereas an output shaft 22 (see FIG. 4) of the torque converter 2 is linked to a transmission 3. The rotation of the engine 1 is transmitted to the transmission 3 via the torque converter 2, which is a fluid clutch configured with an impeller, a turbine and a stator of the known art. The transmission 3 includes hydraulic clutches that switch the speed stage to a setting among first through fourth speeds, as will be explained later, and the speed of the rotation of the output shaft 22 at the torque converter 2 is altered via the transmission 3. The rotation, having undergone the speed change, is transmitted to the tires 113 and 123 via a drive shaft 4 and axles 5, thereby enabling the wheel loader 100 to travel.

The axles 5 each include a braking unit 5a to be engaged to decelerate or stop the wheel loader 100. As hydraulic oil is supplied to the braking unit 5a via a brake valve 32, it generates a braking force corresponding to the pressure of the hydraulic oil. The brake valve 32 is a pressure reducing valve via which the pressure of the pressure oil provided from a hydraulic source 30, at which the hydraulic oil originates, is reduced to a level corresponding to the compressive force imparted from a spring 32a. As the operator steps on a brake pedal 31 located inside the operator's cab 121 and the spring 32a is compressed in correspondence to the stepping force applied to the brake pedal 31, the pressure of the pressure oil provided from the hydraulic source 30, at which the hydraulic oil originates, is reduced via the brake valve 32 so as to achieve a pressure corresponding to the stepping force applied to the brake pedal 31. The brake valve 32 lowers the pressure of the hydraulic oil so that hydraulic oil achieving a higher pressure is provided to the braking units 5a as the compressive force at the spring 32a becomes higher, i.e., as a greater stepping force is applied to the brake pedal 31. Reference numeral 34 indicates a hydraulic oil tank.

It is to be noted that oil discharged from a work hydraulic pump (not shown), which is driven by the engine 1, is guided via a directional control valve (not shown) to a work actuator (e.g., the arm cylinder 114). The directional control valve is driven in response to an operation at an operation lever (not shown) and the actuator is driven in correspondence to the operation quantity at the operation lever.

The torque converter 2 has a function of increasing the output torque relative to the input torque, i.e., a function of achieving a torque ratio equal to or greater than 1. The torque ratio decreases as a torque converter speed ratio e (=Nt/Ni), which is the ratio of the rotation rate Nt at the output shaft 22 of the torque converter 2 to the rotation rate Ni at the input shaft 21 of the torque converter 2, increases. For instance, as the traveling load increases while the work vehicle is traveling at a constant engine rotation speed, the rotation rate Nt at the output shaft 22 of the torque converter 2 decreases, i.e., the vehicle speed decreases, to result in a decrease in the torque converter speed ratio e. In this situation, the torque ratio increases and thus, the vehicle is able to travel with a greater traveling drive force (with a greater tractive force).

Figure 3:
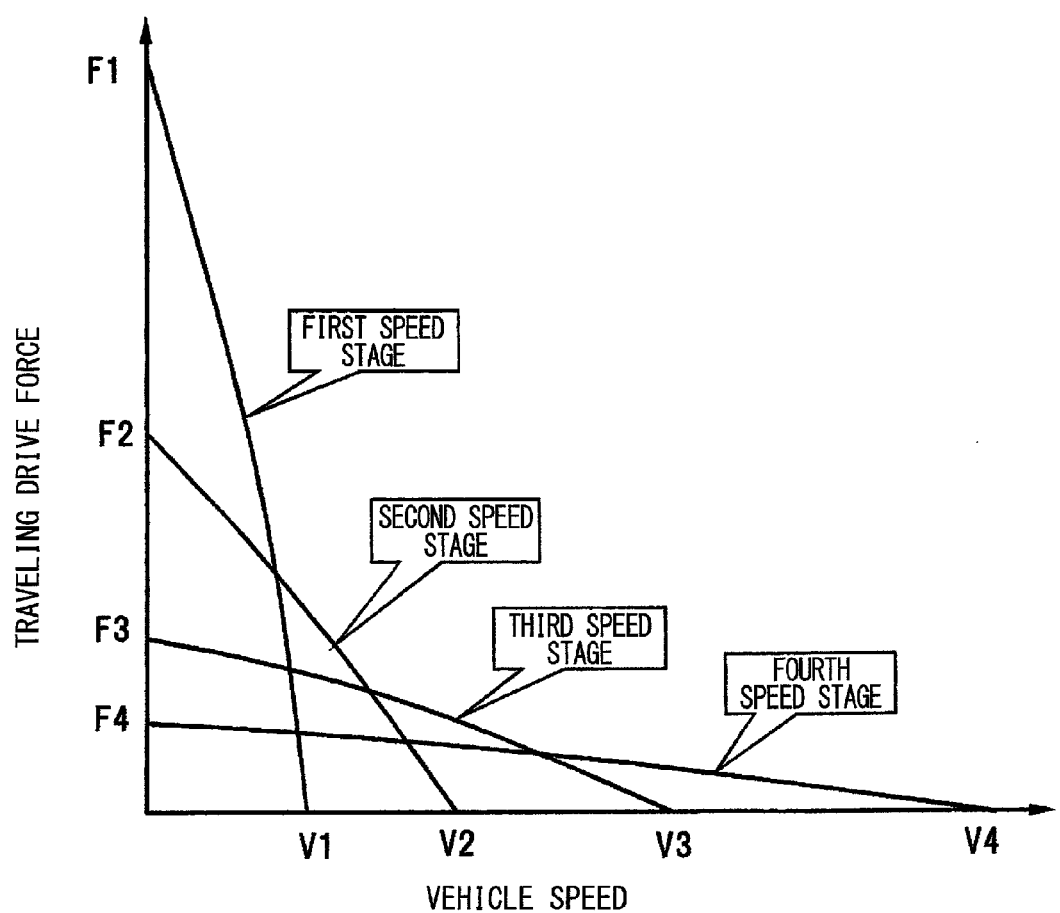

The torque converter output is adjusted to a setting corresponding to one of first through fourth speeds via the transmission 3. FIG. 3 indicates the relationship between the vehicle speed and the traveling drive force at each speed stage. The figure indicates that at a given speed stage, a greater traveling drive force is achieved at a lower vehicle speed (low speed, high torque) and that the traveling drive force becomes reduced as the vehicle speed increases (high speed, low torque). It is to be noted that a greater traveling drive force can be achieved at a given vehicle speed when a lower speed stage is selected.

Figure 4:
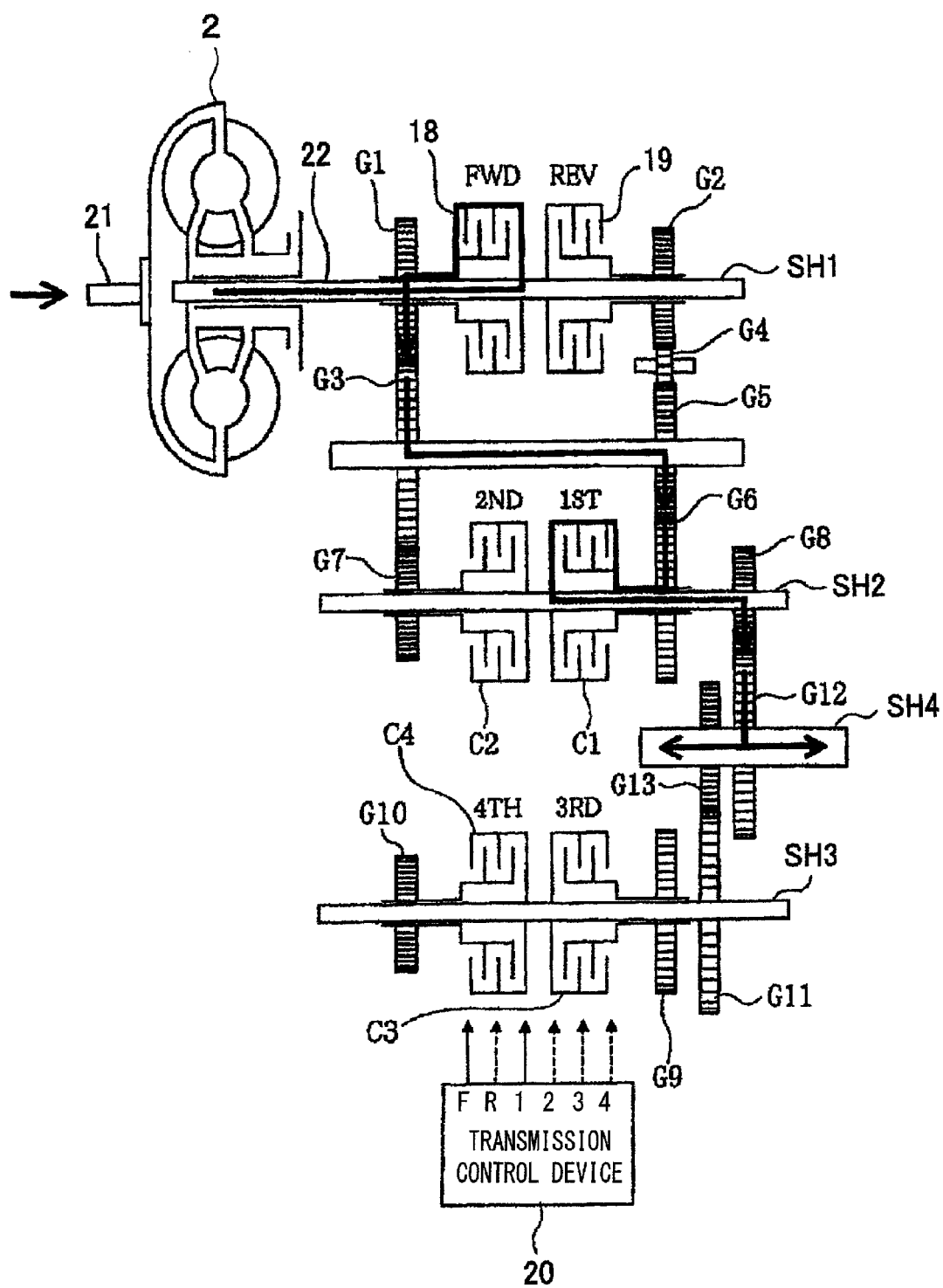

The structure of the transmission 3 will be described next. FIG. 4 schematically illustrates the structure of the transmission 3. The transmission 3 includes a plurality of clutch shafts SH1 through SH3, an output shaft SH4, a plurality of gears G1 through G13, a forward hydraulic clutch (forward clutch) 18, a reverse hydraulic clutch (reverse clutch) 19 and hydraulic clutches C1 through C4 respectively corresponding to first through fourth speeds. The hydraulic clutches 18, 19 and C1 through C4 are each engaged or released with pressure oil (a clutch pressure) supplied via a transmission control device 20. In other words, as the clutch pressure supplied to a given hydraulic clutch among the hydraulic clutches 18, 19 and C1 through C4 increases, the particular clutch among the clutches 18, 19 and C1 through C4 is engaged, whereas as the clutch pressure decreases, the clutch becomes released.

The output shaft 22 of the torque converter 2 is linked to the clutch shaft SH1, and the two ends of the output shaft SH4 are linked to the axles 5, located at the front and at the rear of the vehicle, via the drive shaft 4 shown in FIG. 2. FIG. 4 shows the forward clutch 18 and the first speed clutch C1 in the engaged state and the other clutches 19 and C2 through C4 in the released state. Under these circumstances, the gear G1 and the clutch shaft SH1 rotate as one and the gear G6 and the clutch shaft SH2 rotate as one.

In this situation, the output torque generated at the engine 1 is transmitted to the output shaft SH4 via the input shaft 21 and the output shaft 22 of the torque converter 2, the clutch shaft SH1, the forward clutch 18, the gears G1, G3, G5 and G6, the first speed clutch C1, the clutch shaft SH2 and the gears G8 and G12 as indicated by the bold line in FIG. 4. The work vehicle is thus able to travel at the first speed setting.

When shifting from first speed to second speed, the first speed clutch C1 is set in the released state and the second speed clutch C2 is set in the engaged state with the clutch pressure provided via the transmission control device 20. As a result, the output torque at the engine 1 is transmitted to the output shaft SH4 via the input shaft 21 and the output shaft 22 of the torque converter 2, the clutch shaft SH1, the forward clutch 18, the gears G1, G3 and G7, the second speed clutch C2, the clutch shaft SH2 and the gears G8 and G12, thereby enabling the work vehicle to travel at the second speed setting. Likewise, a shift other than from first speed to second speed, i.e., a shift from second speed to third speed, from third speed to fourth speed, from fourth speed to third speed, from third speed to second speed or from second speed to first speed, is achieved by controlling the clutches C1 through C4.

Automatic speed shift control may be executed by adopting either of the following two methods; torque converter speed ratio reference control under which a speed shift occurs as the torque converter speed ratio e reaches a predetermined value and vehicle speed reference control under which a speed shift occurs as the vehicle speed reaches a predetermined value. In this embodiment, the speed stage at the transmission 3 is regulated under the torque converter speed ratio reference control.

Figure 5:
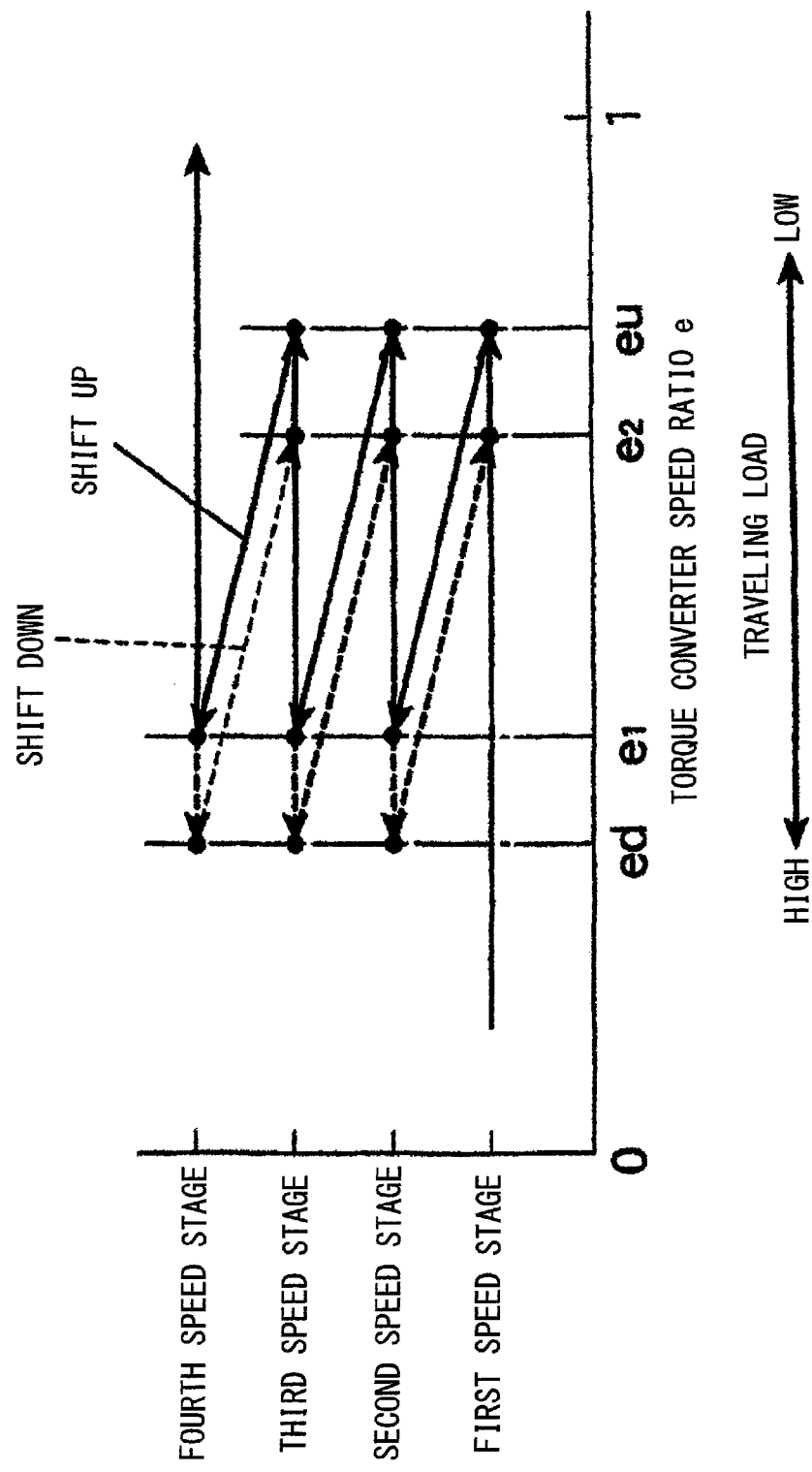

FIG. 5 indicates the relationship between the torque converter speed ratio e and the speed stage. As the traveling load decreases and the torque converter speed ratio e increases until it becomes equal to or greater than a predetermined value eu, the speed stage is shifted up by one stage. As a result, the torque converter speed ratio e becomes equal to e1 (ed<e1<eu). In contrast, as the traveling load increases and the torque converter speed ratio e decreases until it is equal to or less than the predetermined value ed, the speed stage is shifted down by one stage. In this case, the torque converter speed ratio e becomes equal to e2 (ed<e2<eu). The predetermined values eu and ed are set in advance in a controller 10. The controller 10 detects the speed stage that is currently set at the transmission 3 (hereafter referred to as the speed stage setting).

The controller 10 shown in FIG. 2 is configured with an arithmetic processing device that includes a CPU, a ROM, a RAM and other peripheral circuits. A pedal operation quantity detector 12a that detects a pedal operation quantity s (a pedal stroke or a pedal angle) at an accelerator pedal 12, a rotation rate detector 14 that detects the rotation rate Ni at the input shaft 21 of the torque converter 2 and a rotation rate detector 15 that detects the rotation rate Nt at the output shaft 22 of the torque converter 2 are connected to the controller 10. The controller 10, to which a vehicle speed detector 16 that detects the rotation speed of the drive shaft 4 is also connected, calculates through arithmetic operation the vehicle speed v of the wheel loader 100 based upon an output value provided by the vehicle speed detector 16.

When the pedal operation quantity s detected via the pedal operation quantity detector 12a is equal to or greater than a predetermined value s1 (see FIG. 7), the controller 10 decides that the accelerator pedal 12 has been operated, whereas when the pedal operation quantity s provided by the pedal operation quantity detector 12a is less than the predetermined value s1, it decides that the accelerator pedal 12 has not been operated. The predetermined value s1 is set so as to be also used as a threshold value (see FIG. 7) for raising a target engine rotation speed Ns from a low idling rotation speed (e.g., 1200 rpm) and is stored in advance in the ROM or the RAM at the controller 10.

As shown in FIG. 2, a forward/reverse selector switch 7, via which a forward or reverse command for the vehicle is issued, a clutch cutoff selector switch 9 via which a selection is made as to whether or not to perform a clutch cutoff (which will be described in detail later) and a switching device 35 that switches to either automatic shift or manual shift at the transmission 3 are connected to the controller 10. In addition, a shift switch 8 via which a command indicating a specific speed stage is issued during a manual shift operation or a command designating a specific speed stage, among first through fourth speeds, as the maximum speed stage is issued during an automatic shift operation, and a clutch cutoff operation mode selector switch 36 that switches cutoff conditions for releasing the forward and reverse clutches 18 and 19, as will be described later, are connected to the controller 10. The controller 10 detects the current operation mode (a first mode or a second mode).

Figure 6:
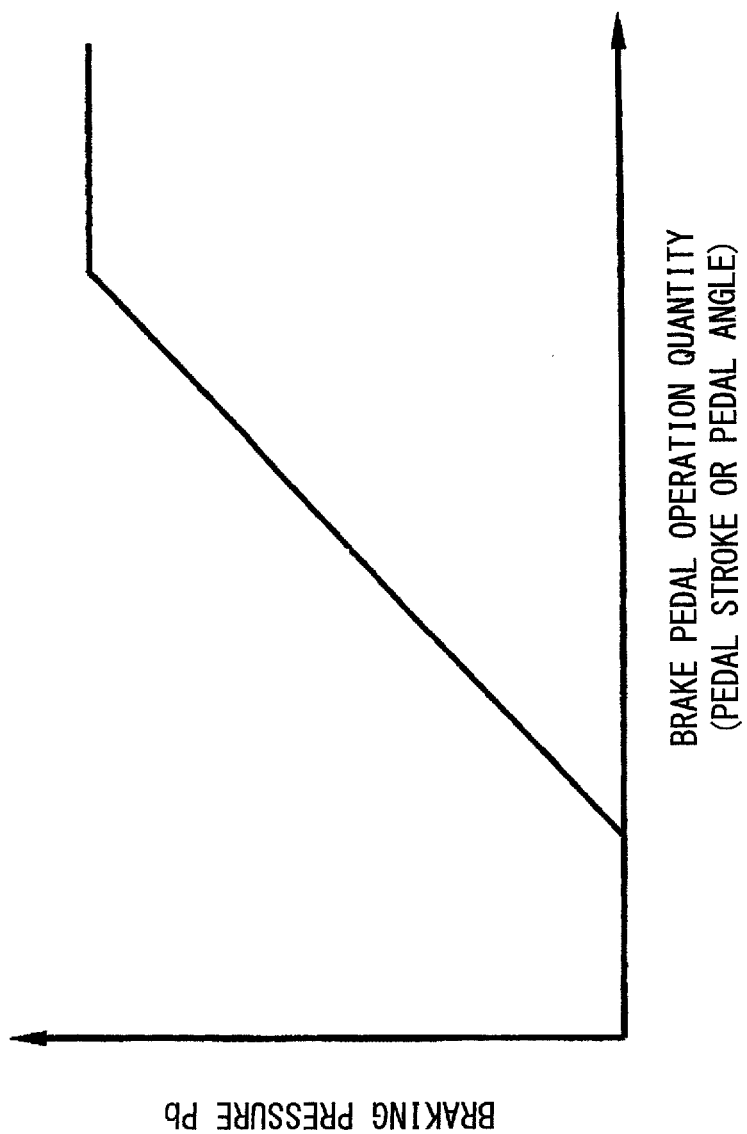

A pedal operation quantity detector 31a that detects an operation quantity (a pedal stroke or a pedal angle) at the brake pedal 31 and a pressure sensor 33 that detects the pressure of the hydraulic oil supplied to the braking units 5a are connected to the controller 10. FIG. 6 is a diagram indicating the relationship between the operation quantity at the brake pedal 31 and a braking pressure Pb. As the operation quantity at the brake pedal 31 increases, the braking pressure Pb also increases and a braking force is applied to the wheel loader 100 in correspondence to the pedal operation quantity.

Figure 7:
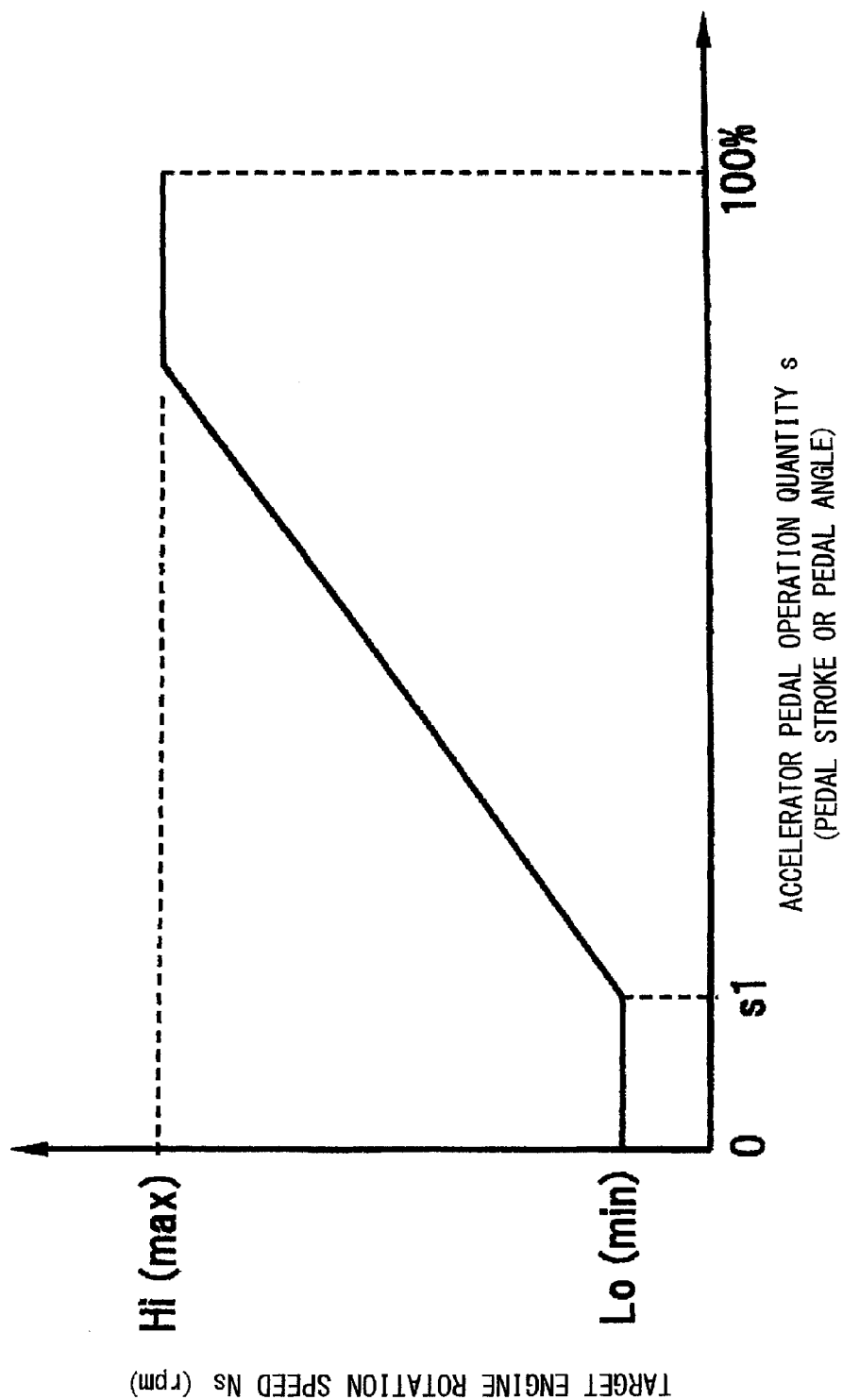

The controller 10 controls the rotation speed (rotation rate) of the engine 1 in correspondence to the operation quantity at the accelerator pedal 12 detected by the pedal operation quantity detector 12a. FIG. 7 is a diagram indicating the relationship between the operation quantity s at the accelerator pedal 12 and the target engine rotation speed Ns. As the operation quantity s at the accelerator pedal 12 increases, the target engine rotation speed Ns becomes higher and when the accelerator pedal is operated to the maximum extent, the target engine rotation speed Ns is equal to the rated rotation speed. The controller 10 outputs a control signal that corresponds to the target engine rotation speed Ns to an engine control unit (not shown) so as to control the engine 1 to achieve an actual rotation speed equal to the target engine rotation speed Ns. The operator increases the operation quantity s at the accelerator pedal 12 so as to raise the engine rotation speed when he/she wishes to increase the vehicle speed or increase the traveling drive force.

When the wheel loader 100 is engaged in operation for, for instance, loading dirt or the like onto a dump truck, the operator driving the wheel loader 100 closer to the dump truck ensures that the rotation rate at the engine 1 is sustained at a high level by stepping on the accelerator pedal 12 in order to raise the bucket 112 while at the same time stepping on the brake pedal 31 so as to decelerate the wheel loader 100. When the clutch cutoff selector switch 9 is set so as to enable a clutch cutoff, the controller 10 outputs a control signal, in response to which the clutches 18 and 19 are set in the released state, to the transmission control device 20 upon deciding that the clutch cutoff condition, to be detailed later, has been established. In the following description, the control signal used to set the clutches 18 and 19 in the released state will be referred to as a cutoff signal. As the transmission control device 20 receives the cutoff signal, a clutch pressure for engaging the clutches 18 and 19 in operation is decreased through a clutch cutoff valve 17 (see FIG. 2) disposed in the transmission control device 20. As a result, the clutches 18 and 19 are released, thereby cutting off transmission of the traveling drive force (hereafter simply referred to as the drive force). The instance of setting the clutches 18 and 19 in the released state as described above will be referred to as a clutch cutoff.

When the clutch cutoff selector switch 9 is set so as to disallow a clutch cutoff, the controller 10 does not output a cutoff signal even if the clutch cutoff condition has been established. In other words, if the clutch cutoff selector switch 9 is set so as to disallow a clutch cutoff, the clutch cutoff described earlier will not take place.

Figure 8:
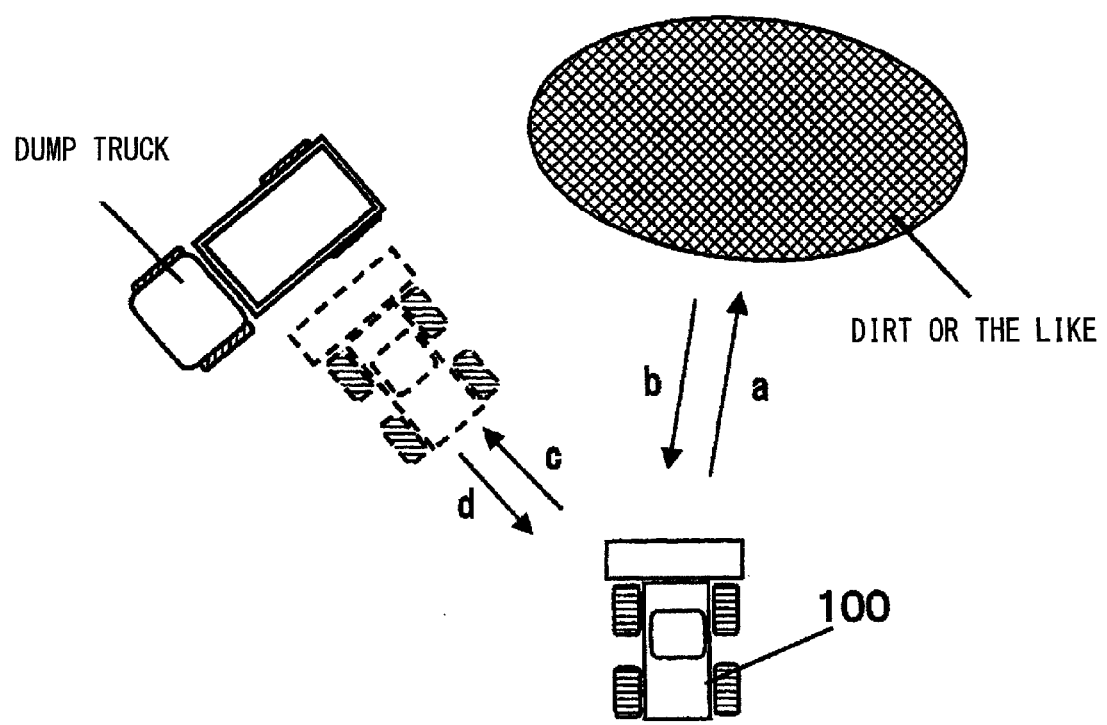

FIG. 8 illustrates how a V-shaped loading operation, representing a method that may be adopted when loading dirt or the like onto a dump truck, is performed. In the V-shaped loading operation, the wheel loader 100 is caused to advance forward, as indicated by an arrow a, in order to scoop up dirt or the like, and then the wheel loader 100 is caused to back away as indicated by an arrow b. Next, the wheel loader 100 is caused to advance forward toward the dump truck as indicated by an arrow c, and once the dirt or the like having been scooped up is loaded onto the dump truck, the wheel loader 100 is caused to back away to its initial position, as indicated by an arrow d.

When loading dirt or the like onto the dump truck, as indicated by the arrow c in FIG. 8, a large drive force, such as that required for excavating operation, is not required. For this reason, the operator normally either sets the maximum speed stage to second speed via the shift switch 8, or switches, via the switching device 35, to the manual speed shift setting for the transmission 3 and then selects the speed stage to fix to second speed.

Figure 9:
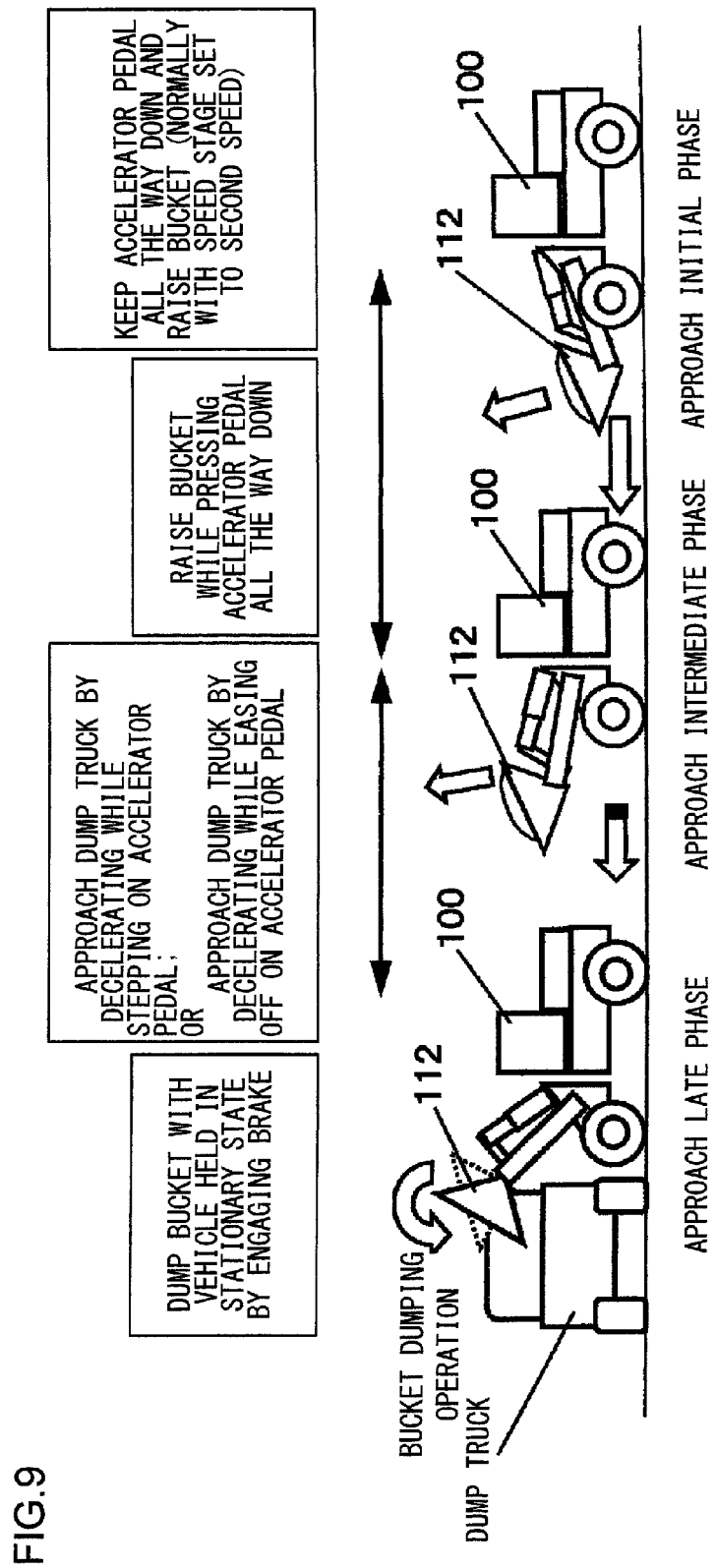

FIG. 9 illustrates the wheel loader 100 engaged in operation for loading dirt or the like onto the dump truck as indicated by the arrow c in FIG. 8. In order to assure clarity in the description, an initial period of approach, during which the wheel loader 100 is accelerating to move closer to the target object, i.e., the dump truck, onto which the dirt or the like is to be loaded, will be referred to as an approach initial phase. An intermediate period of approach to the dump truck, during which the wheel loader 100 starts to decelerate and comes to a stop, will be referred to as an approach intermediate phase. The period from when the wheel loader 100 comes to a stop till when the dirt or the like in the bucket 112 is completely emptied into the dump truck will be referred to as an approach late phase.

As FIG. 9 illustrates, the accelerator pedal 12 is stepped on to the maximum extent in order to accelerate the wheel loader 100 and also raise the bucket 112 during the approach initial phase. In the approach intermediate phase, the accelerator pedal 12 is stepped on to the maximum extent in order to raise the bucket 112 and, at the same time, the operator steps on the brake pedal 31 gradually so as to decelerate the wheel loader 100. It is to be noted that during the approach intermediate phase, the ascent of the bucket 112 may be completed while the wheel loader 100 is still traveling and in such a case, the operator may let off the accelerator pedal 12 and gradually step on the brake pedal 31 in order to decelerate the wheel loader 100.

In the approach late phase, the brake pedal 31 is stepped on to the maximum extent in order to hold the wheel loader 100 in a stationary state. If the clutch cutoff selector switch 9 is set so as to enable a clutch cutoff, a clutch cutoff occurs once the clutch cutoff condition, to be described in detail later, is established due to, for instance, an operation performed by the operator at the brake pedal 31 during the approach intermediate phase.

During the approach intermediate phase, if the clutch cutoff condition is in effect as the operator steps on the accelerator pedal 12 thereby raising the bucket 112 and also gradually presses down the brake pedal 31, thereby decelerating the wheel loader 100, transmission of the drive force is cut off while the wheel loader 100 approaches the dump truck, and thus, the wheel loader 100 does not need to be decelerated or brought to a stop against the drive force. As a result, compared to the case where the wheel loader 100 is decelerated and brought to a stop against the drive force without enabling a clutch cutoff, the braking units 5a in this case are subjected to less load, an increase in the temperature at the braking units 5a is prevented more effectively and the various parts of the braking units 5a do not become worn as readily. When a clutch cutoff is enabled, the torque converter speed ratio e, i.e., the ratio of the rotation rate at the input shaft 21 and the rotation rate at the output shaft 22, remain substantially at 1 even if the wheel loader is decelerated and brought to a stop while sustaining the rotation rate of the engine 1 at a high level. Under these circumstances, the torque input from the engine 1 to the torque converter 2 is extremely small, which makes it possible to reduce the extent of motive power loss at the torque converter 2 and ultimately reduce the fuel consumption.

However, if the clutch cutoff takes place prematurely, transmission of the drive force will be halted suddenly as clutch cutoff is effected before the drive force is fully suppressed by the braking force. The sudden decrease in drive force at the wheel loader 100, in turn, may cause the entire wheel loader 100 to pitch sharply forward/backward. The extent of such pitching tends to increase when, for instance, the wheel loader 100 is engaged in dirt loading operation with the bucket 112 raised to a high position. The operator is bound to experience discomfort as the wheel loader 100 pitches, and moreover, the dirt or the like loaded in the bucket 112 may spill. For this reason, the operator has to pay close attention to the operation of the braking units 5a while driving the wheel loader 100 in order to ensure that the vehicle decelerates gradually and comes to stop smoothly.

In order to avoid pitching, the operator of a wheel loader in the related art engaged in operation for loading dirt or the like onto a dump truck may set the clutch cutoff selector switch 9 so as to disable the clutch cutoff described above. In such a case, while pitching, which occurs as described above, is prevented, the various parts constituting the braking units 5a are bound to become readily worn and the extent of motive power loss at the torque converter 2 is bound to increase.

In order to decelerate the work vehicle and bring it to a smooth stop by preventing pitching, which tends to occur when a clutch cutoff takes place with premature timing, the drive force being transmitted to the wheels must be sufficiently reduced or fully overcome with the braking force imparted via the braking units 5a before the clutch cutoff occurs. It is to be noted that a greater drive force is imparted at a lower vehicle speed at a given speed stage setting (see FIG. 3). Accordingly, it is desirable to release the clutches 18 and 19 at a higher braking force when the vehicle speed is lower and to release the clutches 18 and 19 at a lower braking force when the vehicle speed is higher.

Under the control described above, which allows clutch cutoff to occur in a state in which the drive force is sufficiently reduced with a high braking force even when the vehicle speed is low, i.e., even when the drive force is significant, the work vehicle can be decelerated smoothly. It should be borne in mind that if the timing of the clutch cutoff is late, transmission of the drive force will be halted and a high braking force will be applied as the clutch cutoff is effected, which may cause the wheel loader 100 to stop abruptly and pitch forward/backward as described earlier.

As explained earlier, the ascent of the bucket 112 may be completed and the operator may gradually press down on the brake pedal 31 in order to decelerate the wheel loader 100 while letting off the accelerator pedal 12 during the approach intermediate phase. If the operator is not stepping on the accelerator pedal 12 in the traveling state, the driving force imparted in the vehicle is small and the vehicle is caused to decelerate via engine braking. Thus, even if clutch cutoff takes place early, the vehicle is allowed to come to a stop smoothly without experiencing any pitching. However, if the braking force imparted after the clutch cutoff is too small, the braking distance is bound to be unnecessarily long, and for this reason, it is desirable for the clutch cutoff to occur at a certain level of braking force. In other words, the braking distance can be reduced by ensuring that clutch cutoff occurs only after the vehicle is fully decelerated via the braking forces imparted by engine braking and the braking units 5a.

Figure 10:
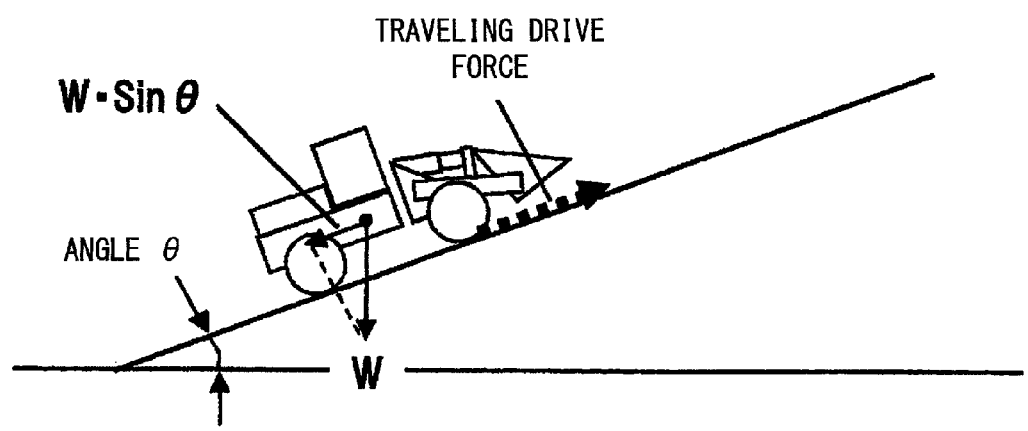

When the wheel loader 100 is engaged in operation as it travels uphill on a steep slope (e.g., with an angle of inclination at approximately 25°) as shown in FIG. 10, a great drive force is normally required and thus, the speed stage at the transmission 3 is set to first speed, i.e., at low speed. On a steep slope, the weight of the wheel loader 100 itself acts as a traveling load along the downward direction (backwards), and for this reason, a clutch cutoff will occur with premature timing if a clutch cutoff is enabled under the same condition as the clutch cutoff condition for flat ground operation. As a result, the drive force will be cut off as the clutches become cut off with an insufficient braking force, which will cause the wheel loader 100 to move downhill in the opposite direction from the traveling direction. Under these circumstances, the operator will step on the brake pedal harder in an attempt to stop the wheel loader 100, which may cause the wheel loader 100 to come to a sudden stop and pitch forward/backward as has been described earlier.

Accordingly, it is desirable for the clutch cutoff to occur somewhat early during a dirt loading operation performed by raising the bucket 112 to a high position on flat ground and for the clutch cutoff to occur somewhat later during an operation performed on a steep slope.

The clutch cutoff operation mode selector switch 36 mentioned earlier is structured so that it can be manually set by the operator to a first mode in which clutch cutoff occurs with earlier timing or advanced timing or to a second mode in which clutch cutoff occurs with later timing or retarded timing. In other words, the clutch cutoff operation mode selector switch 36 is structured so that it can be set to either the first mode in which the clutches 18 and 19 are released at a low braking force or the second mode in which the clutches 18 and 19 are released at a high braking force, so as to select an optimal clutch cutoff condition. The first mode, in which clutch cutoff occurs early, is ideal for an operation performed on flat ground to load dirt or the like.

The second mode, in which clutch cutoff occurs late, is ideal for an operation performed on a steep slope (e.g., at an angle of inclination of 25° or more).

The timing with which clutch cutoff is enabled is set automatically as described below in the wheel loader 100 achieved in the embodiment. As a result, the clutch cutoff is allowed to occur with the optimal timing in correspondence to any of various traveling/operating conditions in the embodiment.

—Clutch Cutoff Control—

In the embodiment, the clutch cutoff timing is determined as detailed below in order to ensure that clutch cutoff occurs with optimal timing corresponding to a given set of traveling/operating conditions among the various traveling/operating conditions mentioned above.

(1) When the wheel loader 100 is traveling toward the dump truck as the operator steps on the accelerator pedal 12 to the maximum extent so as to raise the bucket 112 and at the same time gradually steps on the brake pedal 31 in order to decelerate the wheel loader 100, clutch cutoff is enabled earlier at a higher vehicle speed.

(2) When the wheel loader 100 is traveling toward the dump truck as the operator lets off the accelerator pedal 12 and at the same time gradually steps on the brake pedal 31 to decelerate the wheel loader 100, clutch cutoff is enabled with predetermined timing regardless of the vehicle speed.

(3) In comparison to the clutch cutoff timing for, for instance, an operation performed on flat ground with the speed stage set to second speed at the transmission 3, the clutch cutoff timing for an operation performed on a steep slope with the speed stage set to first speed at the transmission 3 is retarded.

(4) The clutch cutoff timing described in (1) through (3) is advanced when the first mode is selected and is retarded when the second mode is selected.

In more specific terms, the controller 10 makes a decision as to whether or not the clutch cutoff condition has been established, based upon information indicating whether or not the accelerator pedal 12 is being operated, the vehicle speed v, the current speed stage setting at the transmission 3, the clutch cutoff operation mode (first mode or second mode) and the braking pressure Pb, and upon deciding that the clutch cutoff condition has been established, the controller 10 executes engage/release control for the clutches 18 and 19 so as to release the clutches 18 and 19.

Figure 11:
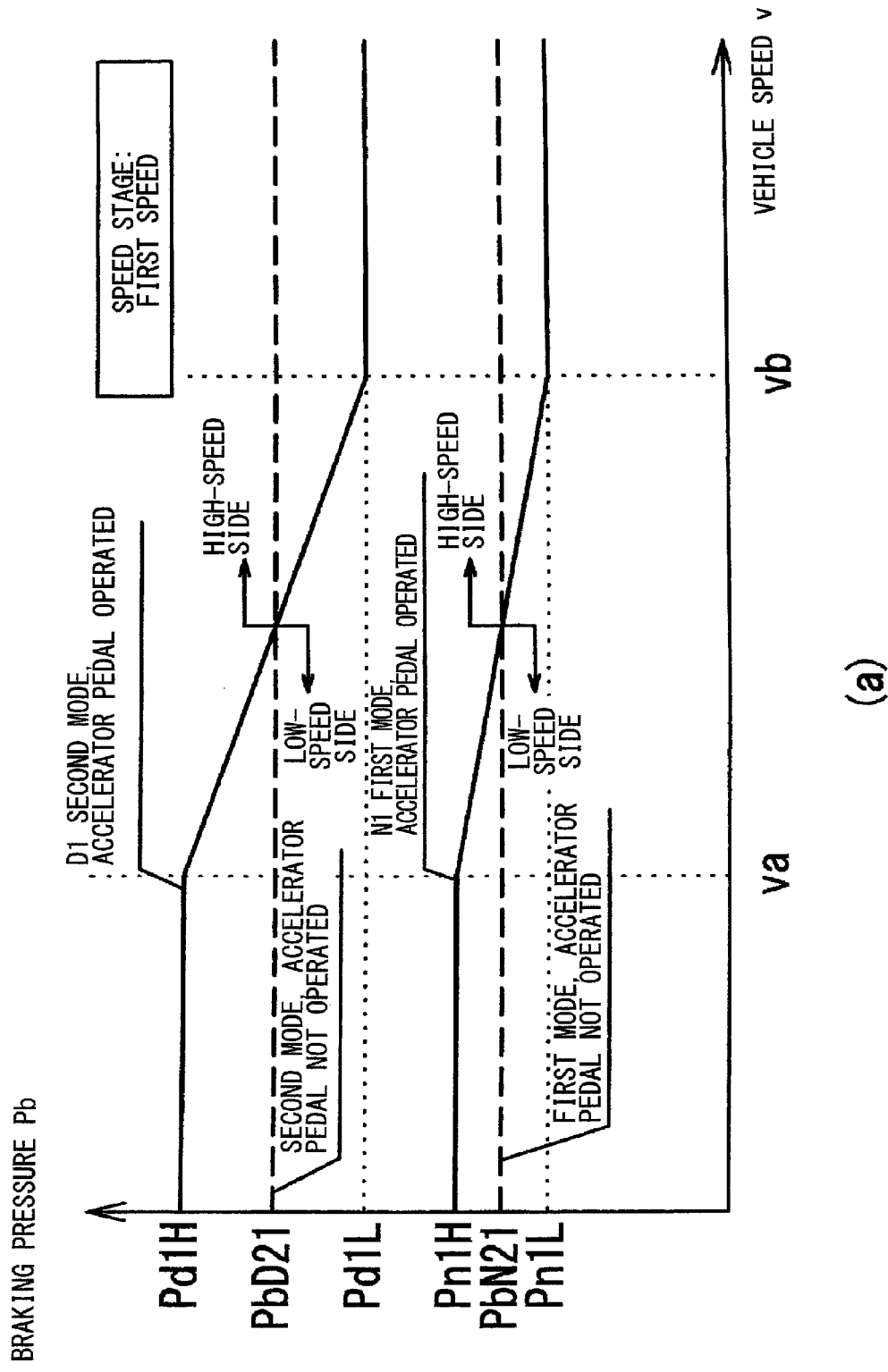
Figure 11:
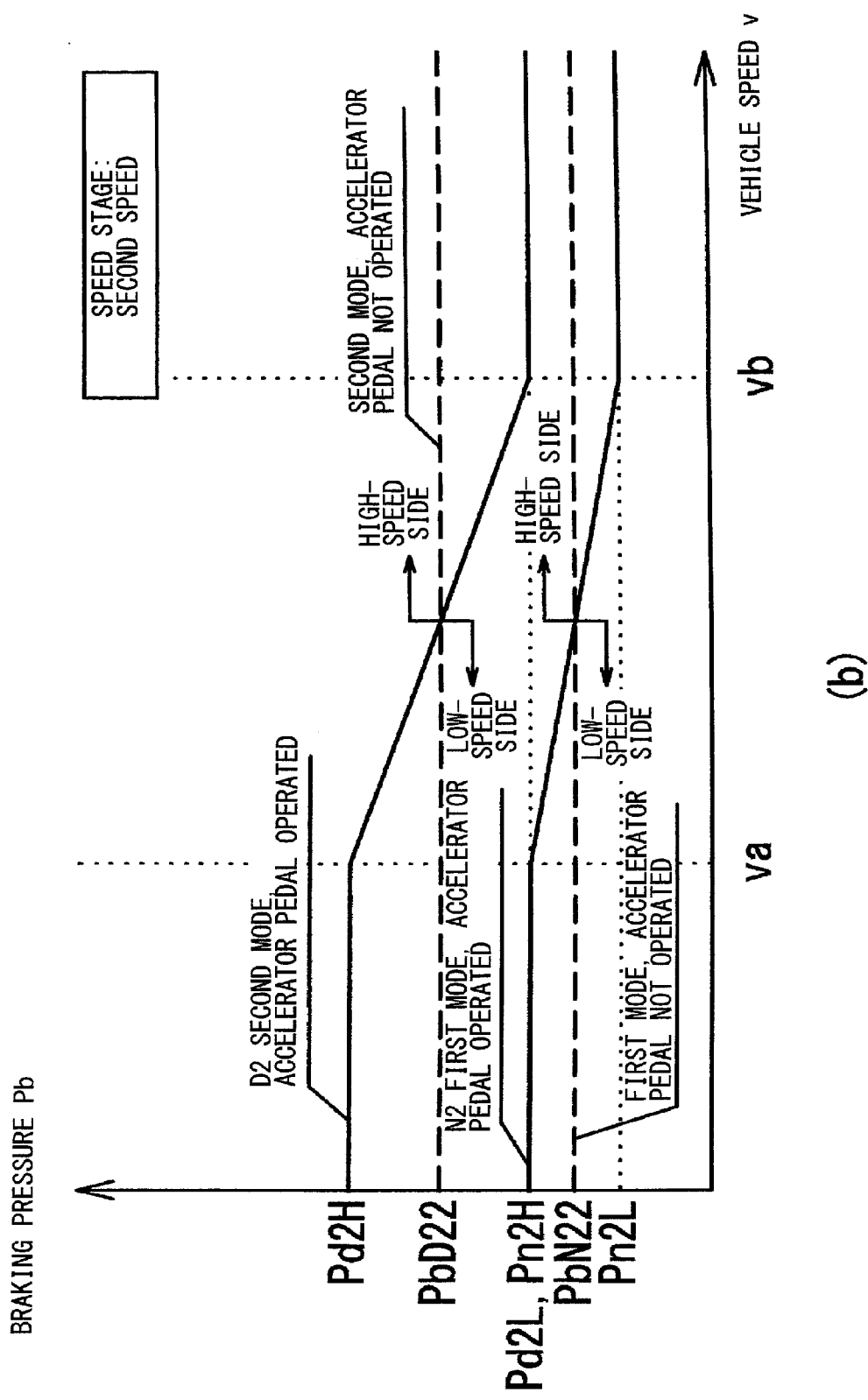
Figure 12:
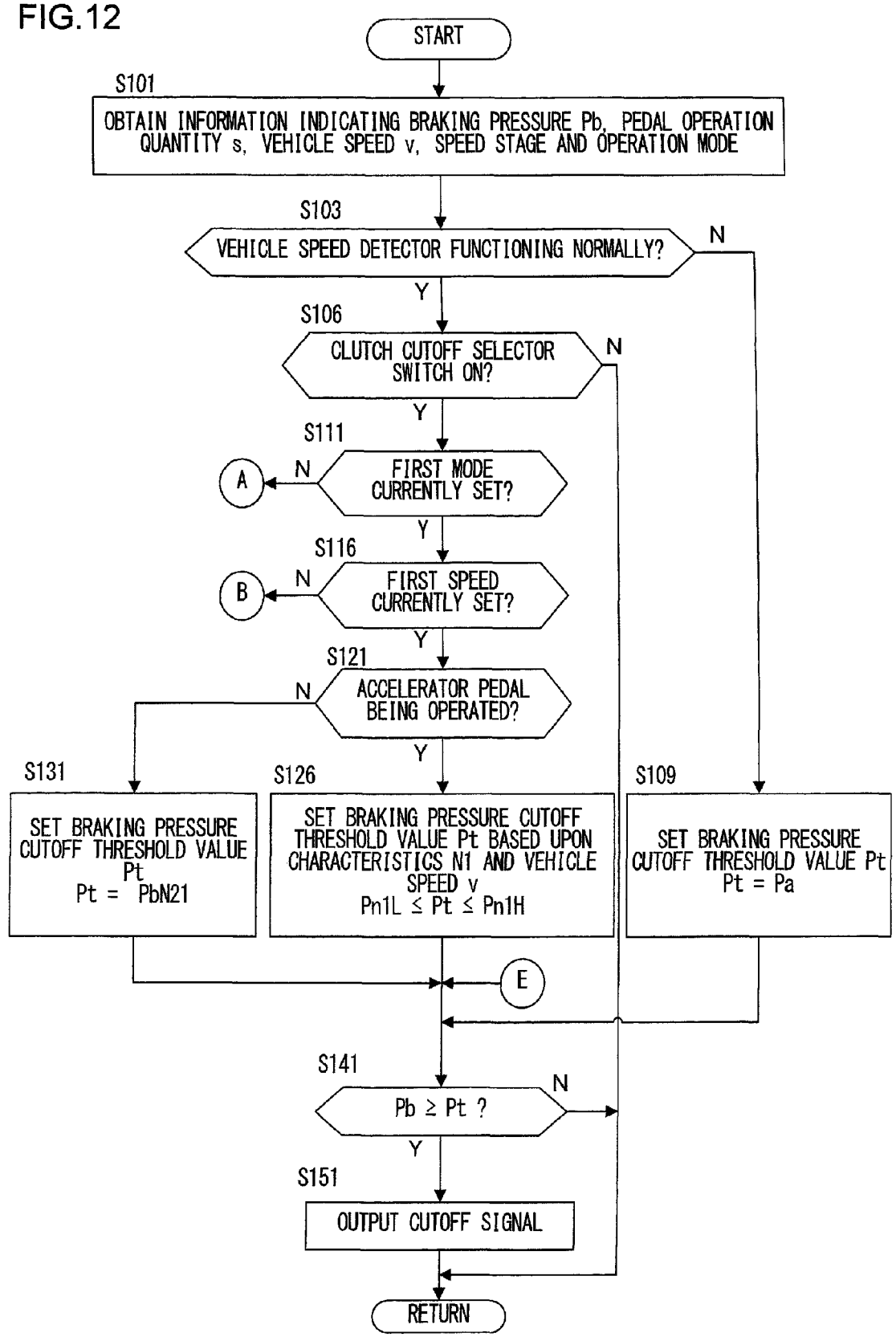

FIG. 11 indicates the clutch cutoff conditions, with the vehicle speed v indicated along the horizontal axis and the braking pressure Pb indicated along the vertical axis. FIG. 11(a) indicates the relationship between the vehicle speed v and the braking pressure Pb that needs to be achieved to enable clutch cutoff when the speed stage is set to first speed. FIG. 11(b) indicates the relationship between the vehicle speed v and the braking pressure Pb that needs to be achieved to enable clutch cutoff when the speed stage is set to second speed. FIG. 11 indicates characteristics N1, D1, N2 and D2 that a braking pressure cutoff threshold value Pt, at which clutch cutoff is enabled while the accelerator pedal 12 is being operated, assumes. These characteristics N1, D1, N2 and D2 are stored in the ROM or the RAM at the controller 10 in a lookup table format. In FIG. 11, braking pressure cutoff threshold values Pt (PbN21, PbD21, PbN22 and PbD22), at which clutch cutoff is enabled when the accelerator pedal 12 is not being operated, are indicated by broken lines. The predetermined values PbN21, PbN22, PbD21 and PbD22 are also stored in the ROM or the RAM at the controller 10.

It is to be noted that the braking pressure cutoff threshold value Pt taking on any of the characteristics N1, D1, N2 and D2 is equivalent to the braking pressure Pb at which a braking force at least high enough to lower the vehicle speed v against the driving force is generated even when the accelerator pedal 12 is operated to the maximum extent.

The characteristics N1 are used when the speed stage is set to first speed, the clutch cutoff operation mode is set to the first mode and the operator is stepping on the accelerator pedal 12. The characteristics D1 are used when the speed stage is set to first speed, the clutch cutoff operation mode is set to the second mode and the operator is stepping on the accelerator pedal 12. The characteristics N2 are used when the speed stage is set to second speed, the clutch cutoff operation mode is set to the first mode and the operator is stepping on the accelerator pedal 12. The characteristics D2 are used when the speed stage is set to second speed, the clutch cutoff operation mode is set to the second mode and the operator is stepping on the accelerator pedal 12. It is to be noted that the vehicle speeds corresponding to the points at which the lines representing the characteristics N1, D1, N2 and D2 respectively intersect the corresponding broken lines representing the braking pressure cutoff threshold value Pt (PbN21, PbD21, PbN22 and PbD22), used when the accelerator pedal is not being operated, are each designated as a reference vehicle speed and that a vehicle speed lower relative to the reference vehicle speed is defined as a low-speed side vehicle speed and a vehicle speed higher relative to the reference vehicle speed is defined as a high-speed side vehicle speed.

The braking pressure cutoff threshold value Pt set based upon the characteristics N1 decreases linearly as the vehicle speed v increases within a vehicle speed range (va≤v≤vb) from equal to or greater than a low-speed side vehicle speed threshold value va (e.g., 2 km/h) to equal to or less than a high-speed side vehicle speed threshold value vb (e.g., 5 km/h). When the vehicle speed v is less than the low-speed side vehicle speed threshold value va, the braking pressure cutoff threshold value Pt is set to Pn1H, whereas when the vehicle speed v is higher than the high-speed side vehicle speed threshold value vb, the braking pressure cutoff threshold value Pt is set to Pn1L.

Likewise, the braking pressure cutoff threshold value Pt set based upon the characteristics D1 decreases linearly as the vehicle speed v increases within the vehicle speed range (va≤v≤vb) from equal to or greater than the low-speed side vehicle speed threshold value va to equal to or less than the high-speed side vehicle speed threshold value vb. When the vehicle speed v is less than the low-speed side vehicle speed threshold value va, the braking pressure cutoff threshold value Pt is set to Pd1H, whereas when the vehicle speed v is higher than the high-speed side vehicle speed threshold value vb, the braking pressure cutoff threshold value Pt is set to Pd1L.

The braking pressure cutoff threshold value Pt set based upon the characteristics N2 decreases linearly as the vehicle speed v increases within the vehicle speed range (va≤v≤vb) from equal to or greater than the low-speed side speed threshold value va to equal to or less than the high-speed side vehicle speed threshold value vb. When the vehicle speed v is less than the low-speed side vehicle speed threshold value va, the braking pressure cutoff threshold value Pt is set to Pn2H, whereas when the vehicle speed v is higher than the high-speed side vehicle speed threshold value vb, the braking pressure cutoff threshold value Pt is set to Pn2L.

Likewise, the braking pressure cutoff threshold value Pt set based upon the characteristics D2 decreases linearly as the vehicle speed v increases within the vehicle speed range (va≤v≤vb) from equal to or greater than the low-speed side vehicle speed threshold value va to equal to or less than the high-speed side vehicle speed threshold value vb. When the vehicle speed v is less than the low-speed side vehicle speed threshold value va, the braking pressure cutoff threshold value Pt is set to Pd2H, whereas when the vehicle speed v is higher than the high-speed side vehicle speed threshold value vb, the braking pressure cutoff threshold value Pt is set to Pd2L.

Namely, when the operator is stepping on the accelerator pedal 12, the clutch cutoff condition is set so that the clutches 18 and 19 are released at a higher braking force as the vehicle speed decreases and that the clutches 18 and 19 are released at a lower braking force as the vehicle speed increases.

Under this control, the clutch cutoff is allowed to occur later at a lower vehicle speed and earlier at a higher vehicle speed when the operator, stepping on the accelerator pedal 12 to the maximum extent in order to raise the bucket 112 during, for instance, the approach intermediate phase, gradually steps on the brake pedal 31 in order to decelerate the wheel loader 100.

It is to be noted that the drive force generated when the speed stage is set to second speed is smaller than that generated when the speed stage is set to first speed and thus, a smaller braking force is needed at the second speed setting to decelerate the wheel loader 100 or to bring it to a complete stop. For this reason, a greater braking pressure cutoff threshold value Pt is taken when the speed stage is set to first speed compared to the braking pressure cutoff threshold value Pt taken at the second speed setting (Pn1H>Pn2H, Pn1L>Pn2L, Pd1H>Pd2H, Pd1L>Pd2L). Namely, the clutch cutoff condition is set so as to release the clutches 18 and 19 at a lower braking force at the first speed setting than at the second speed setting.

The braking pressure Pn1L is less than Pd1L (Pn1L<Pd1L) and the braking pressure Pn1H is less than Pd1H (Pn1H<Pd1H). The braking pressure Pn2L is less than Pd2L (Pn2L<Pd2L) and the braking pressure Pn2H is less than Pd2H (Pn2H<Pd2H). In other words, the clutch cutoff condition is set so that the clutches 18 and 19 are released at a low braking force in the first mode and that the clutches 18 and 19 are released in the second mode at a braking force higher than that in the first mode.

In FIG. 11(*a*), the braking pressure cutoff threshold value Pt=PbN21, at which the clutch cutoff is enabled when the speed stage is set to first speed, the clutch cutoff operation mode is set to the first mode and the operator is not operating the accelerator pedal 12, is indicated by a broken line. Likewise, the braking pressure cutoff threshold value Pt=PbD21, at which the clutch cutoff is enabled when the speed stage is set to first speed, the clutch cutoff operation mode is set to the second mode and the operator is not operating the accelerator pedal 12, is indicated by a broken line.

In FIG. 11(*b*), the braking pressure cutoff threshold value Pt=PbN22, at which the clutch cutoff is enabled when the speed stage is set to second speed, the clutch cutoff operation mode is set to the first mode and the operator is not operating the accelerator pedal 12, is indicated by a broken line. Likewise, the braking pressure cutoff threshold value Pt=PbD22, at which the clutch cutoff is enabled when the speed stage is set to second speed, the clutch cutoff operation mode is set to the second mode and the operator is not operating the accelerator pedal 12, is indicated by a broken line. Namely, the clutch cutoff condition is set so that when the accelerator pedal 12 is not being operated, the clutches 18 and 19 are released at a predetermined braking force regardless of the vehicle speed.

It is to be noted that greater values are assumed for the braking pressure cutoff threshold value Pt when the speed stage is set to first speed compared to the values taken for the braking pressure cutoff threshold value Pt when the speed stage is set to second speed (PbN21>PdN22, PbD21>PbD22). Namely, the clutch cutoff condition is set so that the clutches 18 and 19 are released at a lower braking force when the speed stage is set to second speed relative to the braking force at which the clutches 18 and 19 are released at the first speed setting.

The braking pressure PdN21 is less than PdD21 (PdN21<PdD21) and the braking pressure PbN22 is less than PbD22 (PbN22<PbD22). In other words, the clutch cutoff condition is set so that the clutches 18 and 19 are released at a low braking force in the first mode and that the clutches 18 and 19 are released at a high braking force in the second mode.

The braking pressure PbN21 is lower than Pn1H and greater than Pn1L (Pn1L<PbN21<Pn1H). The braking pressure PbD21 is lower than Pd1H and greater than Pd1L (Pd1L<PbD21<Pd1H). The braking pressure PbN22 is lower than Pn2H and greater than Pn2L (Pn2L<PbN22<Pn2H). The braking pressure PbD22 is lower than Pd2H and higher than Pd2L (Pd2L<PbD22<Pd2H).

This means that the clutch cutoff condition is set on the low-speed side so that the clutches 18 and 19 are released at a lower braking force when the accelerator pedal 12 is not being operated compared to when the accelerator pedal 12 is being operated. In contrast, the clutch cutoff condition is set on the high-speed side so that the clutches 18 and 19 are released at a higher braking force when the accelerator pedal 12 is not being operated compared to when the accelerator pedal 12 is being operated.

By setting the clutch cutoff condition as described above, the clutch cutoff can be enabled, for instance, on the low-speed side with advanced timing if the operator releases the accelerator pedal 12 and gradually steps on the brake pedal 31 in order to decelerate the wheel loader 100 during the approach intermediate phase, compared to the clutch cutoff timing assumed when the accelerator pedal 12 is being operated. In contrast, the clutch cutoff can be enabled on the high-speed side with retarded timing when the operator is not pressing on the accelerator pedal 12 compared to the timing with which the clutch cutoff is enabled when the accelerator pedal 12 is being operated.

Upon deciding, based upon the various types of information input thereto and the characteristics N1, N2, D1 or D2 or the predetermined value PbN21, PbN22, PbD21 or PbD22 explained above, that the clutch cutoff condition has been established, the controller 10 outputs the cutoff signal to the transmission control device 20.

The following is a description of the clutch cutoff control, given in reference to the flowchart presented in FIG. 12 through FIG. 15.

FIGS. 12 through 15 present a flowchart of the clutch control processing operation executed in the wheel loader 100 achieved in the embodiment. A program enabling the processing shown in FIG. 12 through FIG. 15 is started up as an ignition switch (not shown) is turned on in the wheel loader 100, and the program thus started up is repeatedly executed by the controller 10. In step S101, information indicating the braking pressure Pb detected via the pressure sensor 33, information indicating the pedal operation quantity s detected via the pedal operation quantity detector 12a, information indicating the vehicle speed v detected via the vehicle speed detector 16, and information indicating the speed stage setting at the transmission 3 and the current clutch cutoff operation mode (the first or second mode) detected by the controller 10, are obtained and then the operation proceeds to step S103.

In step S103, a decision is made as to whether or not the vehicle speed detector 16 is in the normal operating state. The controller 10 decides that an error has occurred if hardly any change occurs in the value output by the vehicle speed detector 16 when the speed stage setting or the engine rotation speed changes. Upon making an affirmative decision in step S103, i.e., upon deciding that the vehicle speed detector 16 is operating in a normal state, the operation proceeds to step S106. Upon making a negative decision in step S103, however, the operation proceeds to step S109 to set the braking pressure cutoff threshold value Pt to a predetermined value Pa stored in advance in the ROM or in the RAM at the controller 10, before the operation proceeds to step S141.

In step S141, a decision is made as to whether or not the braking pressure Pb obtained in step S101 is equal to or greater than the braking pressure cutoff threshold value Pt that has been set. If an affirmative decision is made in step S141, the operation proceeds to step S151 in which the cutoff signal mentioned earlier is output to the transmission control device 20 before the operation makes a return.

The braking pressure PbN21, for instance, should be selected as the braking pressure cutoff threshold value Pt=Pa that is set upon deciding that an error has occurred at the vehicle speed detector 16 if the speed stage is set to first speed and the operation mode is set to the first mode. The braking pressure PbN22 should be selected as the braking pressure cutoff threshold value Pt=Pa if the speed stage is set to second speed and the operation mode is set to the first mode. The braking pressure PbD21 should be selected as the braking pressure cutoff threshold value Pt=Pa if the speed stage is set to first speed and the operation mode is set to the second mode. The braking pressure PbD22 should be selected as the braking pressure cutoff threshold value Pt=Pa if the speed stage is set to second speed and the operation mode is set to the second mode.

In other words, if it is decided in step S103 that the vehicle speed detector 16 is malfunctioning, the clutch cutoff is enabled at a predetermined braking force regardless of whether or not the accelerator pedal 12 is being operated and the vehicle speed v. Through these measures, it is ensured that the clutch cutoff timing is never set based upon an abnormal output value from the vehicle speed detector 16.

In step S106, a decision is made as to whether or not the clutch cutoff selector switch 9 is set so as to enable clutch cutoff. Upon making an affirmative decision in step S106, i.e., upon deciding that the clutch cutoff selector switch 9 is set so as to enable the clutch cutoff, the operation proceeds to step S111 to make a decision as to whether or not the clutch cutoff operation mode selector switch 36 is currently set to the first mode. Upon making an affirmative decision in step S111, i.e., upon deciding that the clutch cutoff operation mode selector switch 36 is set to the first mode, the operation proceeds to step S116 to make a decision as to whether or not the speed stage setting currently selected at the transmission 3 is first speed.

Upon making an affirmative decision in step S116, i.e., upon deciding that the current speed stage setting selected at the transmission 3 is first speed, the operation proceeds to step S121 to make a decision as to whether or not the accelerator pedal 12 is being operated. Upon making an affirmative decision in step S121, i.e., upon deciding that the accelerator pedal 12 is being operated, the operation proceeds to step S126 to set the braking pressure cutoff threshold value Pt (Pn1L≤Pt≤Pn1H) based upon the vehicle speed v obtained in step S101 by referencing the table holding the characteristics N1 (see FIG. 11(a)). If a negative decision is made in step S121, i.e., if it is decided that the accelerator pedal 12 is not being operated, the operation proceeds to step S131 to set the braking pressure cutoff threshold value Pt to PbN21 (Pt=PbN21). Once the braking pressure cutoff threshold value Pt is set in step S126 or in step S131, the operation proceeds to step S141 to execute the processing explained earlier.

Figure 13:
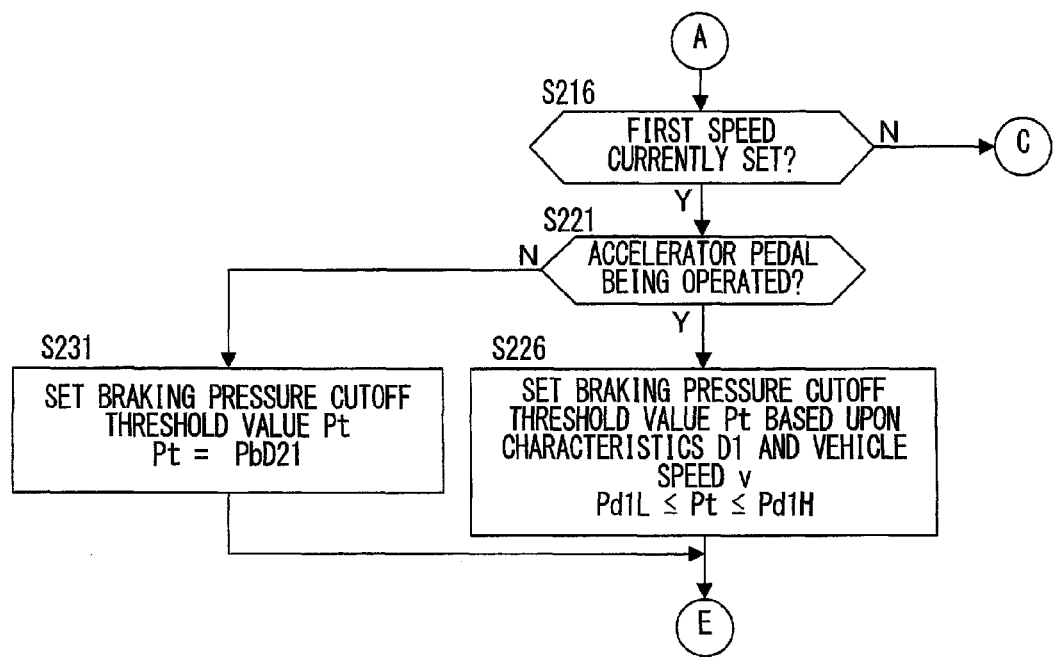

Upon making a negative decision in step S111, the operation proceeds to step S216 in FIG. 13 to make a decision as to whether or not the speed stage setting currently selected at the transmission 3 is first speed. Upon making an affirmative decision in step S216, i.e., upon deciding that the current speed stage setting selected at the transmission 3 is first speed, the operation proceeds to step S221 to make a decision as to whether or not the accelerator pedal 12 is being operated. Upon making an affirmative decision in step S221, i.e., upon deciding that the accelerator pedal 12 is being operated, the operation proceeds to step S226 to set the braking pressure cutoff threshold value Pt (PdL≤Pt≤Pd1H) based upon the vehicle speed v obtained in step S101 by referencing the table holding the characteristics D1 (see FIG. 11(a)). If a negative decision is made in step S221, i.e., if it is decided that the accelerator pedal 12 is not being operated, the operation proceeds to step S231 to set the braking pressure cutoff threshold value Pt to PbD21 (Pt=PbD21). Once the braking pressure cutoff threshold value Pt is set in step S226 or in step S231, the operation proceeds to step S141 in FIG. 12 to execute the processing explained earlier.

Figure 14:
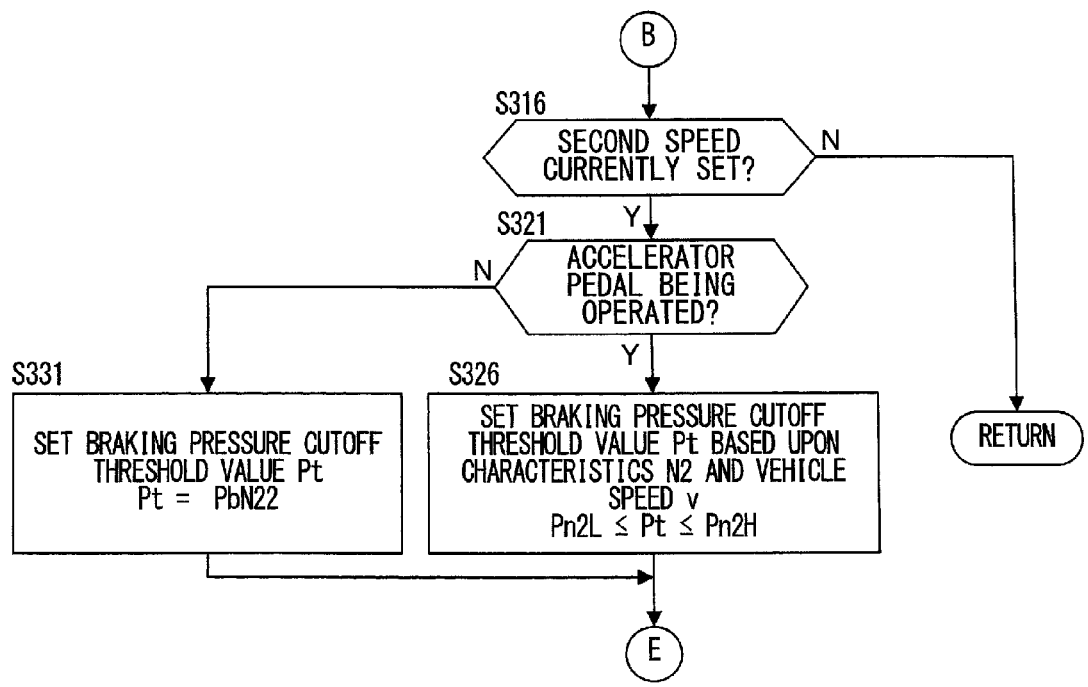

Upon making a negative decision in step S116, the operation proceeds to step S316 in FIG. 14 to make a decision as to whether or not the speed stage setting currently selected at the transmission 3 is second speed. Upon making an affirmative decision in step S316, i.e., upon deciding that the current speed stage setting selected at the transmission 3 is second speed, the operation proceeds to step S321 to make a decision as to whether or not the accelerator pedal 12 is being operated. Upon making an affirmative decision in step S321, i.e., upon deciding that the accelerator pedal 12 is being operated, the operation proceeds to step S326 to set the braking pressure cutoff threshold value Pt (Pn2L≤Pt≤Pn2H) based upon the vehicle speed v obtained in step S101 by referencing the table holding the characteristics N2 (see FIG. 11(b)). If a negative decision is made in step S321, i.e., if it is decided that the accelerator pedal 12 is not being operated, the operation proceeds to step S331 to set the braking pressure cutoff threshold value Pt to PbN22 (Pt=PbN22). Once the braking pressure cutoff threshold value Pt is set in step S326 or in step S331, the operation proceeds to step S141 in FIG. 12 to execute the processing explained earlier.

Figure 15:
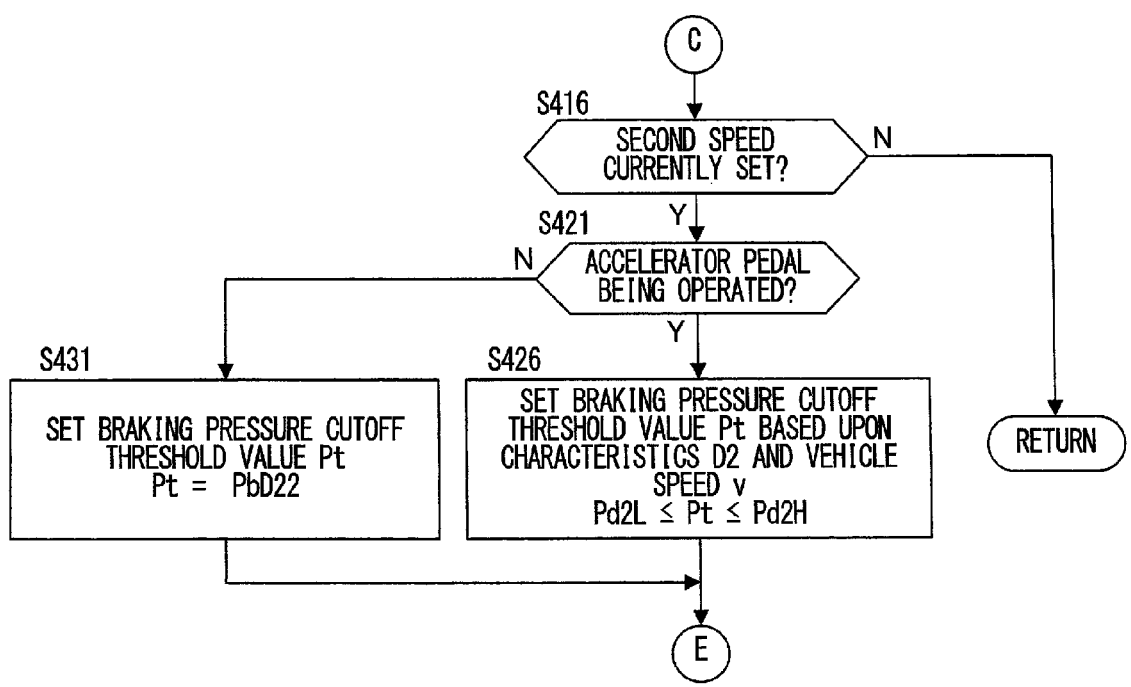

Upon making a negative decision in step S216 in FIG. 13, the operation proceeds to step S416 in FIG. 15 to make a decision as to whether or not the speed stage setting currently selected at the transmission 3 is second speed. Upon making an affirmative decision in step S416, i.e., upon deciding that the current speed stage setting selected at the transmission 3 is second speed, the operation proceeds to step S421 to make a decision as to whether or not the accelerator pedal 12 is being operated. Upon making an affirmative decision in step S421, i.e., upon deciding that the accelerator pedal 12 is being operated, the operation proceeds to step S426 to set the braking pressure cutoff threshold value Pt (Pd2L≤Pt≤Pd2H) based upon the vehicle speed v obtained in step S101 by referencing the table holding the characteristics D2 (see FIG. 11(b)). If a negative decision is made in step S421, i.e., if it is decided that the accelerator pedal 12 is not being operated, the operation proceeds to step S431 to set the braking pressure cutoff threshold value Pt to PbD22 (Pt=PbD22). Once the braking pressure cutoff threshold value Pt is set in step S426 or in step S431, the operation proceeds to step S141 in FIG. 12 to execute the processing explained earlier.

Upon making a negative decision in step S106, S141, S316 or S416, the operation makes a return.

The following advantages are achieved through the embodiment described above.

(1) The controller 10 sets the braking pressure cutoff threshold value Pt at which the clutch cutoff is enabled based upon whether or not the accelerator pedal 12 is being operated. As a result, the clutches 18 and 19 are released with optimal timing both when the accelerator pedal 12 is being operated and when the accelerator pedal 12 is released.

(2) When the accelerator pedal 12 is being operated, the controller 10 selects a lower value for the braking pressure cutoff threshold value Pt at a higher vehicle speed v and selects a higher value for the braking pressure cutoff threshold value Pt at a lower vehicle speed v (see the characteristics N1, N2, D1 and D2 in FIG. 11).

Under the control executed by the controller 10 as described above, transmission of the drive force to the wheels immediately before the clutch cutoff occurs can be sufficiently reduced with a braking force corresponding to the level of the drive force when the wheel loader 100 is, for instance, approaching a dump truck as the operator steps on the accelerator pedal 12 to the maximum extent in order to raise the bucket 112 while gradually stepping on the brake pedal 31 in order to decelerate the vehicle. As a result, the wheel loader 100 can be decelerated and smoothly brought to a stop without inducing pitching that might otherwise occur when the clutch cutoff occurs, while a significant available drive force is still being applied.

(3) The controller 10 in the wheel loader 100 traveling at a speed on the low-speed side, selects a lower value for the braking pressure cutoff threshold value Pt at which the clutch cutoff is enabled, if the accelerator pedal 12 is not being operated, compared to the value set for the braking pressure cutoff threshold value Pt when the accelerator pedal 12 is being operated. When the accelerator pedal 12 is not being operated, i.e., when the wheel loader 100 is being decelerated via the engine brake under a low drive force, the vehicle can be brought to a stop smoothly without inducing pitching even if the clutch cutoff is enabled at a low braking force. The wheel loader 100, traveling at a low speed with the operator stepping on the accelerator pedal 12, i.e., the wheel loader 100 traveling under a significant drive force, can be made to decelerate by fully reducing the drive force to be transmitted to the wheels with a high braking force before the clutch cutoff occurs, as has been explained in (2) above. As a result, the wheel loader 100 can be decelerated and smoothly brought to a stop without inducing pitching that might otherwise occur when the clutch cutoff occurs, while a significant drive force is applied.

(4) The controller 10 selects a lower value for the braking pressure cutoff threshold value Pt at the second speed stage setting compared to the value selected for the braking pressure cutoff threshold value Pt at the first speed stage setting (see FIG. 11(a) and FIG. 11(b)). Thus, the clutches 18 and 19 can be released with optimal timing both when, for instance, the wheel loader 100 is engaged in operation with the speed stage set at first speed on a steep slope where the wheel loader 100 is required to generate a large drive force and when the wheel loader 100 is engaged in a dirt loading operation or the like by raising the bucket 112 at the second speed stage setting on flat ground.

(5) The controller 10 sets the braking pressure cutoff threshold value Pt so that the clutches 18 and 19 are released at a low braking force when the first mode is selected via the clutch cutoff operation mode selector switch 36 and that the clutches 18 and 19 are released at a high braking force when the second mode is selected via the clutch cutoff operation mode selector switch 36. This means that the operator is able to adjust the timing with which the clutches 18 and 19 are released in correspondence to various traveling/work conditions such as the angle of inclination of the ground surface, the size of the load in the bucket 112 and the type of work being carried out, and consequently, the efficiency of work operations can be improved.

(6) As explained in (1) through (5) above, the controller 10 controls engagement/release of the clutches 18 and 19 so as to release the clutches 18 and 19 upon deciding that the clutch cutoff condition is in effect based upon the information indicating whether or not the accelerator pedal 12 is being operated, the vehicle speed, the braking force, the speed stage setting currently selected at the transmission 3 and the clutch cutoff operation mode (the first mode or the second mode). Under the control executed by the controller 10 described above, the clutch cutoff is enabled with optimal timing in correspondence to various traveling/work conditions including whether the wheel loader 100 is engaged in dirt loading operation on flat ground or in operation performed on sloping ground and thus, smooth maneuvering of the wheel loader 100 is assured.

(7) As explained in (1) through (5) above, the controller 10 automatically sets the braking pressure cutoff threshold value Pt based upon the information indicating whether or not the accelerator pedal 12 is being operated, the vehicle speed, the braking force and the current speed stage setting at the transmission 3. As a result, an improvement in work efficiency is achieved while successfully reducing the operator fatigue factor.

In contrast, a wheel loader equipped with a clutch control device that allows the braking pressure cutoff threshold value Pt to be adjusted by the operator through stepless or multi-stage adjustment necessitates frequent threshold value adjustment by the operator in correspondence to the traveling/operating conditions, and thus, the operator is bound to find it taxing. In addition, the operator may find it difficult to determine the optimal threshold value under certain circumstances, and he/she will need to have considerable experience and skills to be able to manually select the optimal braking pressure cutoff threshold value Pt while he/she is driving the wheel loader.

(8) Upon deciding that an error has occurred at the vehicle speed detector 16, the controller 10 sets the braking pressure cutoff threshold value Pt to a predetermined value regardless of whether or not the accelerator pedal 12 is being operated or the vehicle speed v of the wheel loader 100. Through these measures, it is ensured that the braking pressure cutoff threshold value Pt is never set based upon an abnormal output value provided from the vehicle speed detector 16.

The following variations are also within the scope of the present invention and one of the variations or a plurality of variations may be adopted in combination with the embodiment described above.

(Variations)

(1) In the description provided above, the pressure sensor 33 that detects the braking pressure Pb constitutes a braking force detection unit via which the braking force at the wheel loader 100 is detected. However, the present invention is not limited to this example. Instead of the pressure sensor 33, the pedal operation quantity detector 31a, which detects the operation quantity (the pedal stroke or the pedal angle) at the brake pedal 31, or a detector (not shown) that detects the stepping force applied to the brake pedal 31, for instance, may be used as a braking force detection unit. In other words, any device capable of either directly or indirectly detecting the operation state of the brake (the level of the braking force) may be used as the braking force detection unit. This means that a parameter other than the braking pressure Pb may be referenced as a criterion for the clutch cutoff condition.

(2) While the controller 10 makes a decision as to whether or not the accelerator pedal 12 is being operated based upon the pedal operation quantity s at the accelerator pedal 12 input to the controller 10 from the pedal operation quantity detector 12a in the description provided above, the present invention is not limited to this example. The controller 10 may detect, for instance, the actual rotation rate at the engine 1 and make a decision as to whether or not the accelerator pedal 12 is being operated based upon the actual engine rotation speed instead of the pedal operation quantity s. As a further alternative, a decision as to whether or not the accelerator pedal 12 is being operated may be made based upon a throttle opening or the target engine rotation speed.

(3) While the first mode or the second mode can be set for the clutch cutoff condition via the clutch cutoff operation mode selector switch 36 as explained above, the present invention is not limited to this example. For instance, the clutch cutoff operation mode may be selected from three different modes; a first mode in which the clutch cutoff is enabled with "advanced or earlier" timing, a second mode in which the clutch cutoff is enabled with "retarded or later" timing and a third mode in which the clutch cutoff is enabled with "intermediate" timing. Namely, the present invention may be adopted in conjunction with any system in which the clutch cutoff operation mode can be selected from at least two different modes and the timing for the clutch cutoff can be set to either "advanced" or "retarded".

(4) While the controller 10 outputs a cutoff signal carrying an instruction for releasing the forward and reverse clutches 18 and 19 to the transmission control device 20 so as to enable clutch cutoff as explained above, the present invention is not limited to this example. For instance, the controller 10 may output a cutoff signal carrying an instruction for releasing only the clutch currently in the engaged state when performing clutch cutoff, to the transmission control device 20. Namely, the present invention may be configured such that the controller 10 outputs a cutoff signal carrying a cutoff instruction for the forward clutch 18 alone to the transmission control device 20 in order to perform the clutch cutoff when the wheel loader 100 is traveling forward.

(5) While the transmission 3 can be set to one of the four speed stage settings as explained above, the present invention is not limited to this example and the transmission 3 may be set to a speed stage setting among three speed stages or five or more speed stages.

(6) While a decision as to whether or not the clutch cutoff condition has been established is made only when the transmission 3 is currently set at a low speed stage, i.e., first speed or second speed, the present invention is not limited to this example. For instance, the present invention may be adopted in conjunction with a transmission with five speed stage settings and in such a case, a decision as to whether or not the clutch cutoff condition has been established may be made only when the transmission is set to any of first through third speeds that are low speed stages. Under such circumstances, the clutch cutoff condition will be set so that the clutches 18 and 19 are released at a lower braking force at second speed than at first speed and that the clutches 18 and 19 are released at a lower braking force at third speed than at second speed.

(7) While a decision is made as to whether or not the clutch cutoff condition has been established based upon the information indicating whether or not the accelerator pedal 12 is being operated, the vehicle speed, the braking force, the speed stage setting at the transmission 3 and the clutch cutoff operation mode (the first mode or the second mode) in the description provided above, the present invention is not limited to this example.

For instance, a decision as to whether or not the clutch cutoff condition has been established may be made without factoring in the information indicating either the current speed stage setting at the transmission 3 or the clutch cutoff operation mode. As a further alternative, a decision as to whether or not the clutch cutoff condition has been established may be made simply based upon the information indicating whether or not the accelerator pedal 12 is being operated, the vehicle speed and the braking force without factoring in both the information indicating the speed stage setting at the transmission 3 and the information indicating the clutch cutoff operation mode.

In addition, a decision as to whether or not the clutch cutoff condition has been established may be made based upon the information indicating whether or not the accelerator pedal 12 is being operated and the braking force alone without factoring in any of the information indicating the vehicle speed, the information indicating the speed stage setting at the transmission 3 and the information indicating the clutch cutoff operation mode. In this case, the clutch cutoff condition can be set so as to release the clutches 18 and 19 at a lower braking force when the accelerator pedal 12 is not being operated compared to the braking force at which the clutches 18 and 19 are released when the accelerator pedal 12 is being operated. Furthermore, a decision as to whether or not the clutch cutoff condition has been established may be made by incorporating the information indicating the speed stage setting at the transmission 3 in addition to the information indicating whether or not the accelerator pedal 12 is being operated and the information indicating the braking force, as in the embodiment described earlier.

A decision as to whether or not the clutch cutoff condition has been established may be made simply based upon the information indicating the vehicle speed and the braking force without factoring in any of the information indicating whether or not the accelerator pedal 12 is being operated, the information indicating the speed stage setting at the transmission 3 and the information indicating the clutch cutoff operation mode. In this case, the clutch cutoff condition can be set so that the clutches 18 and 19 are released at a lower braking force when the vehicle speed is higher, as in the embodiment described earlier. Moreover, a decision as to whether or not the clutch cutoff condition has been established may be made by incorporating the information indicating the speed stage setting at the transmission 3 in addition to the information indicating the vehicle speed and information indicating the braking force, as in the embodiment described earlier.

In the description provided above, when an error occurs at the vehicle speed detector 16, the braking pressure cutoff threshold value Pt is set to one of; PbN21, PbD21, PbN22 and PbD22, in correspondence to the selected operation mode and the speed stage setting in much the same way as when the accelerator pedal 12 is not being operated. However, the present invention is not limited to this example. Namely, when the vehicle speed detector 16 is malfunctioning, the braking pressure cutoff threshold value Pt may be set, in correspondence to the selected operation mode and the speed stage setting, to a value falling into the range designated in correspondence to the condition under which the accelerator pedal 12 is being operated.

(9) While the braking pressure cutoff threshold value Pt is set to a fixed value in correspondence to the selected operation mode and the speed stage setting when the accelerator pedal 12 is not being operated in the description provided above, the present invention is not limited to this example. For instance, the braking pressure cutoff threshold value Pt may be set to a higher value on the high-speed side compared to the value selected for the low-speed side. In this case, since the clutch cutoff timing is further retarded when the vehicle is traveling at high speed, the engine brake can be effectively employed so as to decelerate the vehicle without placing a significant load on the braking units 5a.

(10) While the braking pressure cutoff threshold value Pt, represented by the characteristics N1, N2, D1 or D2, is set so that it decreases linearly as the vehicle speed v increases within the vehicle speed range between va and vb in the description provided above, the present invention is not limited to this example. For instance, the decrease in the braking pressure cutoff threshold value Pt occurring as the vehicle speed v increases may be represented by a quadratic curve, or the braking pressure cutoff threshold value Pt may decrease in steps as the vehicle speed v increases.

(11) While the wheel loader 100 represents an example of the work vehicle according to the present invention in the description provided above, the present invention is not limited to this example and may be adopted in another type of work vehicle such as a forklift, a telescopic handler or a lift truck.

While the invention has been particularly shown and described with respect to a preferred embodiment and variations thereof by referring to the attached drawings, the present invention is not limited to these examples and it will be understood by those skilled in the art that various changes in form and detail may be made therein without departing from the scope and teaching of the invention.

The disclosure of the following priority application is herein incorporated by reference:
Japanese Patent Application No. 2011-250022 filed Nov. 15, 2011.

The invention claimed is:

1. A clutch control device for a work vehicle, comprising:
an accelerator pedal operation determination unit that determines as to whether or not an accelerator pedal is being operated;
a vehicle speed detection unit that detects a vehicle speed of the work vehicle;
a braking force detection unit that detects a braking force of the work vehicle;
a clutch cutoff condition storage unit that stores a clutch cutoff condition that is defined as characteristics of the braking force of the work vehicle with respect to whether or not the accelerator pedal is being operated and the vehicle speed of the work vehicle;
a determination unit that determines that the clutch cutoff condition has been established when the braking force of the work vehicle is equal to or greater than a value according to the characteristics of the braking force defined as the clutch cutoff condition, based upon whether or not the accelerator pedal is being operated, as determined by the accelerator pedal operation determination unit, the vehicle speed of the work vehicle detected by the vehicle speed detection unit and the braking force of the work vehicle detected by the braking force detection unit; and
a clutch control unit that controls engagement/release of a clutch so as to release the clutch when the determination unit determines that the clutch cutoff condition has been established, wherein:
the characteristics of the braking force defined as the clutch cutoff condition includes a first characteristic used when the accelerator pedal is being operated, in which the braking force at which the clutch is released decreases with increase in the vehicle speed, and a second characteristic used when the accelerator pedal is not being operated, in which the braking force at which the clutch is released is fixed at a predetermined value; and
the braking force determined according to the second characteristic is lower than the braking force determined according to the first characteristic in a low-speed range in which the vehicle speed is lower than a value corresponding to an intersection point between the first characteristic and the second characteristic.

2. A clutch control device for the work vehicle according to claim 1, further comprising:
a speed stage detection unit that detects a speed stage set at a transmission, wherein:
the determination unit determines as to whether or not the clutch cutoff condition has been established by further factoring in the speed stage at the transmission detected by the speed stage detection unit; and
the first characteristic and the second characteristic defined as the clutch cutoff condition are each set so that the clutch is released at a lower braking force at least when second speed is set than when first speed is set.

3. A clutch control device for a work vehicle, comprising:
an accelerator pedal operation determination unit that determines as to whether or not an accelerator pedal is being operated;
a braking force detection unit that detects a braking force of the work vehicle;
a clutch cutoff condition storage unit that stores a clutch cutoff condition that is defined as characteristics of the braking force of the work vehicle with respect to whether or not the accelerator pedal is being operated;
a determination unit that determines that the clutch cutoff condition has been established when the braking force of the work vehicle is equal to or greater than a value according to the characteristics of the braking force defined as the clutch cutoff condition, based upon whether or not the accelerator pedal is being operated, as determined by the accelerator pedal operation determined unit, and the braking force of the work vehicle detected by the braking force detection unit; and a clutch control unit that controls engagement/release of a clutch so as to release the clutch when the determination unit determines that the clutch cutoff condition has been established, wherein:

the characteristics of the braking force defined as the clutch cutoff condition is set so that the clutch is released at a lower braking force if the accelerator pedal is not being operated than if the accelerator pedal is being operated.

4. A clutch control device for the work vehicle according to claim 3, further comprising:

a speed stage detection unit that detects a speed stage set at a transmission, wherein:

the determination unit determines as to whether or not the clutch cutoff condition has been established by further factoring in the speed stage at the transmission detected by the speed stage detection unit; and the characteristic of the braking force defined as the clutch cutoff condition is set so that the clutch is released at a lower braking force at least when a second speed is set than when a first speed is set.

5. A clutch control device for the work vehicle according to claim 1, further comprising:

an error determination unit that determines as to whether or not an error has occurred at the vehicle speed detection unit, wherein:

when the error determination unit determines that an error has occurred at the vehicle speed detection unit, the clutch is released at a predetermined braking force regardless of whether or not the accelerator pedal is being operated, as determined by the accelerator pedal operation determination unit.

6. A clutch control device for the work vehicle according to claim 1, further comprising:

a mode switching unit that includes a selector switch that is operable by an operator for making a selection of the clutch cutoff condition between a first mode, in which the clutch is released at a low braking force, and a second mode, in which the clutch is released at a high braking force.

7. A clutch control device for the work vehicle according to claim 1, further comprising:

a transmission that includes a plurality of speed stages, wherein:

the determination unit determines as to whether or not the clutch cutoff condition has been established only if a low speed stage is currently selected at the transmission.

* * * * *